United States Patent [19]

Rago

[11] Patent Number: 5,212,789

[45] Date of Patent: May 18, 1993

[54] METHOD AND APPARATUS FOR UPDATING APPLICATION DATABASES USED IN A DISTRIBUTED TRANSACTION PROCESSING ENVIRONMENT

[75] Inventor: Vito Rago, Brooklyn, N.Y.

[73] Assignee: Bell Communications Research, Inc., Livingston, N.J.

[21] Appl. No.: 420,533

[22] Filed: Oct. 12, 1989

[51] Int. Cl.$^5$ .................. G06F 12/14; G06F 15/40
[52] U.S. Cl. .................... 395/600; 364/DIG. 1; 364/222.82; 364/282.1; 364/282.2; 395/575
[58] Field of Search ... 364/200 MS File, 900 MS File, 364/DIG. 1, DIG. 2; 395/600, 700, 200, 275

[56] References Cited

U.S. PATENT DOCUMENTS

| | | | |
|---|---|---|---|
| 4,558,413 | 12/1985 | Schmidt et al. | 364/200 |
| 4,646,229 | 2/1987 | Boyle | 395/600 |
| 4,672,535 | 1/1987 | Katzman et al. | 364/200 |
| 4,718,002 | 1/1988 | Carr | 364/200 |
| 4,755,995 | 7/1988 | Anderson et al. | 371/9 |
| 4,875,159 | 10/1989 | Cary et al. | 364/200 |
| 5,008,814 | 4/1991 | Mathur | 364/200 |
| 5,019,963 | 5/1991 | Alderson et al. | 364/200 |
| 5,046,002 | 9/1991 | Takashi et al. | 364/200 |
| 5,057,996 | 10/1991 | Cutler et al. | 364/200 |
| 5,089,954 | 2/1992 | Rago | 395/600 |

OTHER PUBLICATIONS

E. A. Davis et al., "Life Cycle Support and Update of No. 4 ESS Software", IEEE International Conference on Communications, ICC'82. The Digital Revolution, 13-17 Jun. 1982, Philadelphia, Pa., vol. 13, pp. 5G5.1-5G5.6.

Primary Examiner—David L. Clark
Assistant Examiner—John C. Loomis
Attorney, Agent, or Firm—Leonard Charles Suchyta; James W. Falk

[57] ABSTRACT

A method and apparatus for updating application databases in real time in a distributed transaction processing environment, such as a service control point, without adversely affecting the throughput of transaction processing or losing substantially any conversational transactions that are being processed while updating is occurring. Specifically, two versions, e.g. an old and a new version, of the application databases exist within a memory device, e.g. a shared disk farm. After the start of a "transfer time period", all transactional messages associated with transactions that were initiated after the start of this period are processed using only the new versions of the application databases, while all transactional messages that are associated with transactions that were initiated prior to the start of this period are processed using the old versions thereof. At the expiration of this period, no such transactions will be processed using the old versions of the application databases, at which time, the old version of each such database can be deleted, if desired, from the memory device.

11 Claims, 22 Drawing Sheets

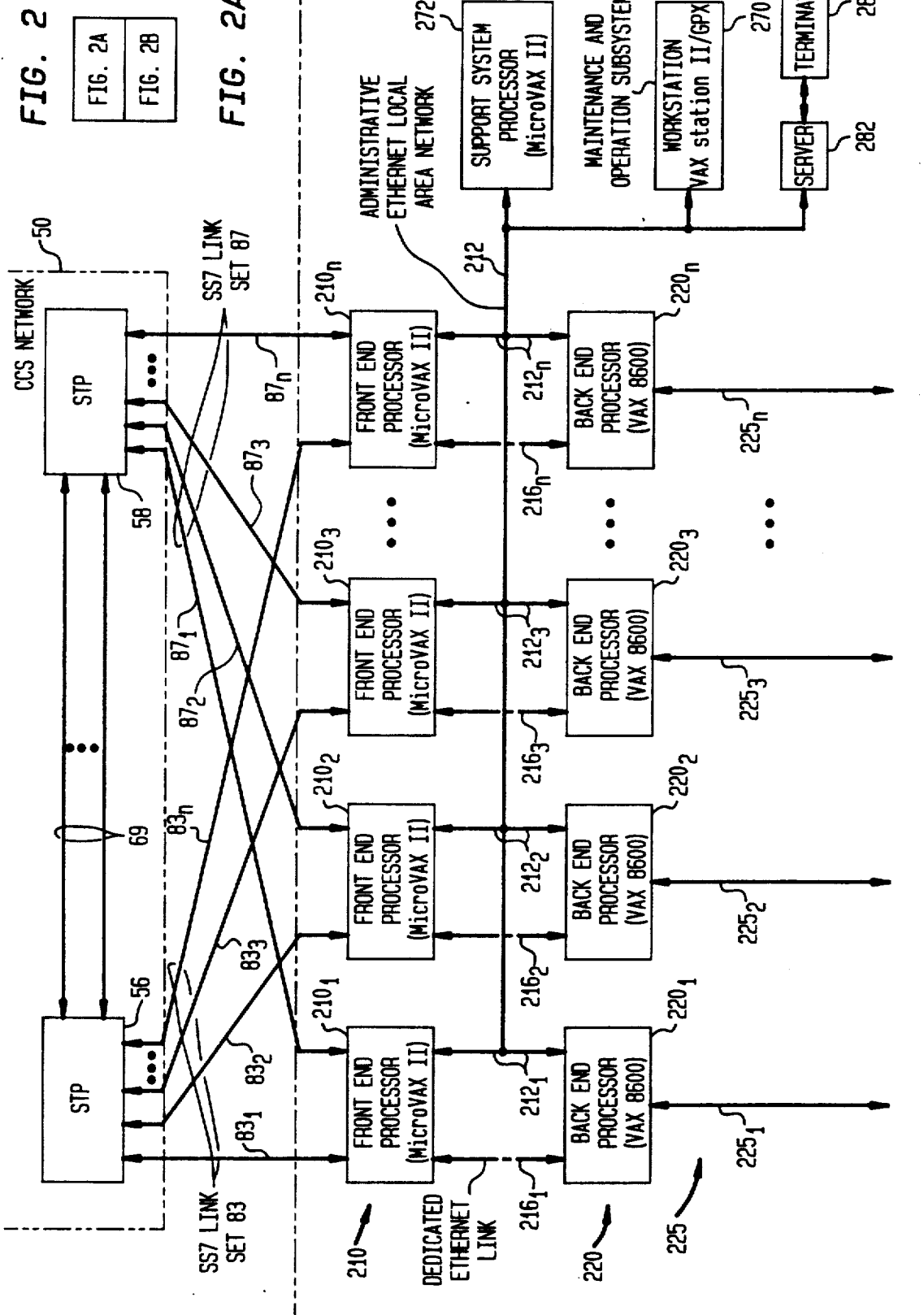

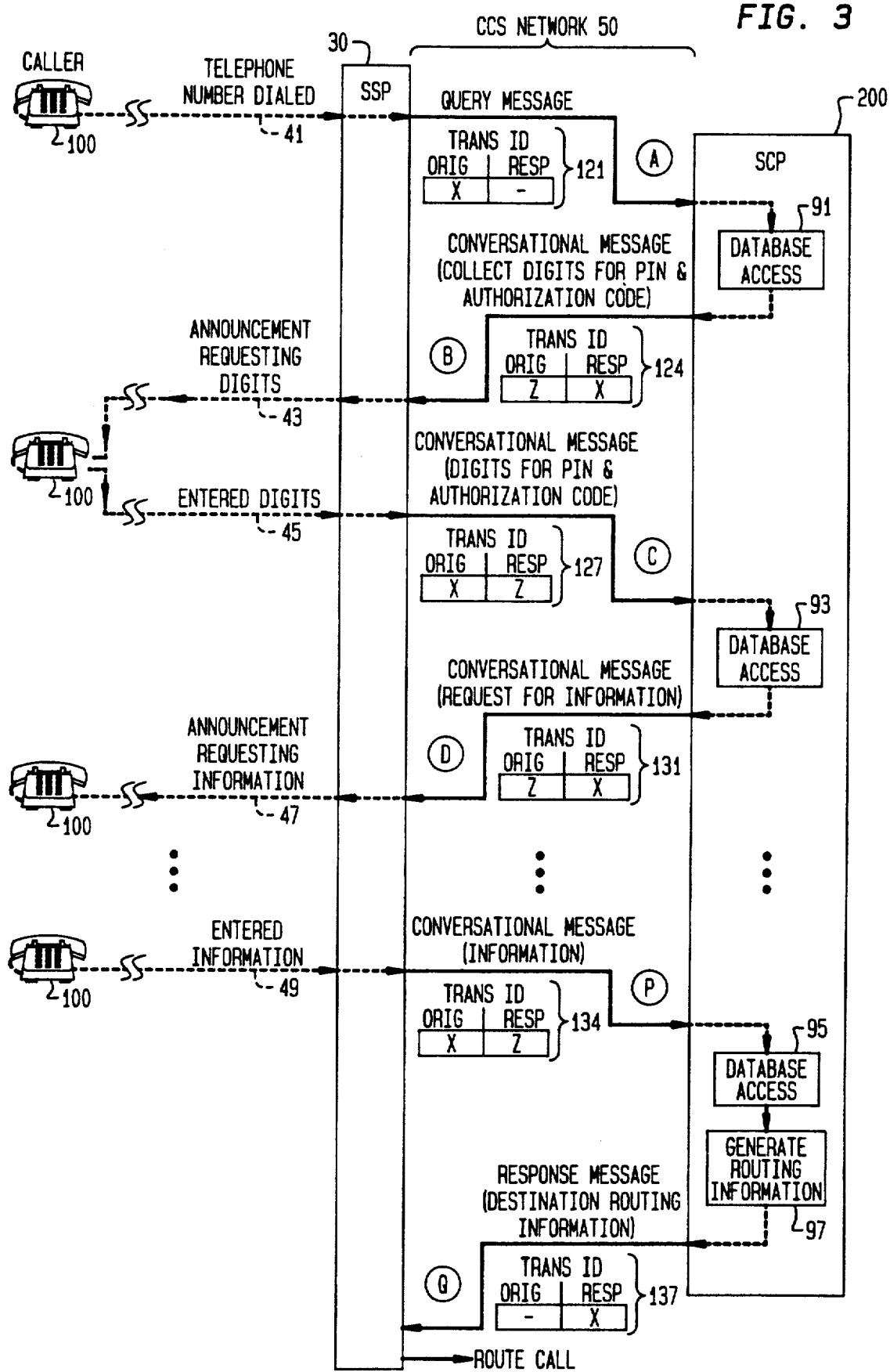

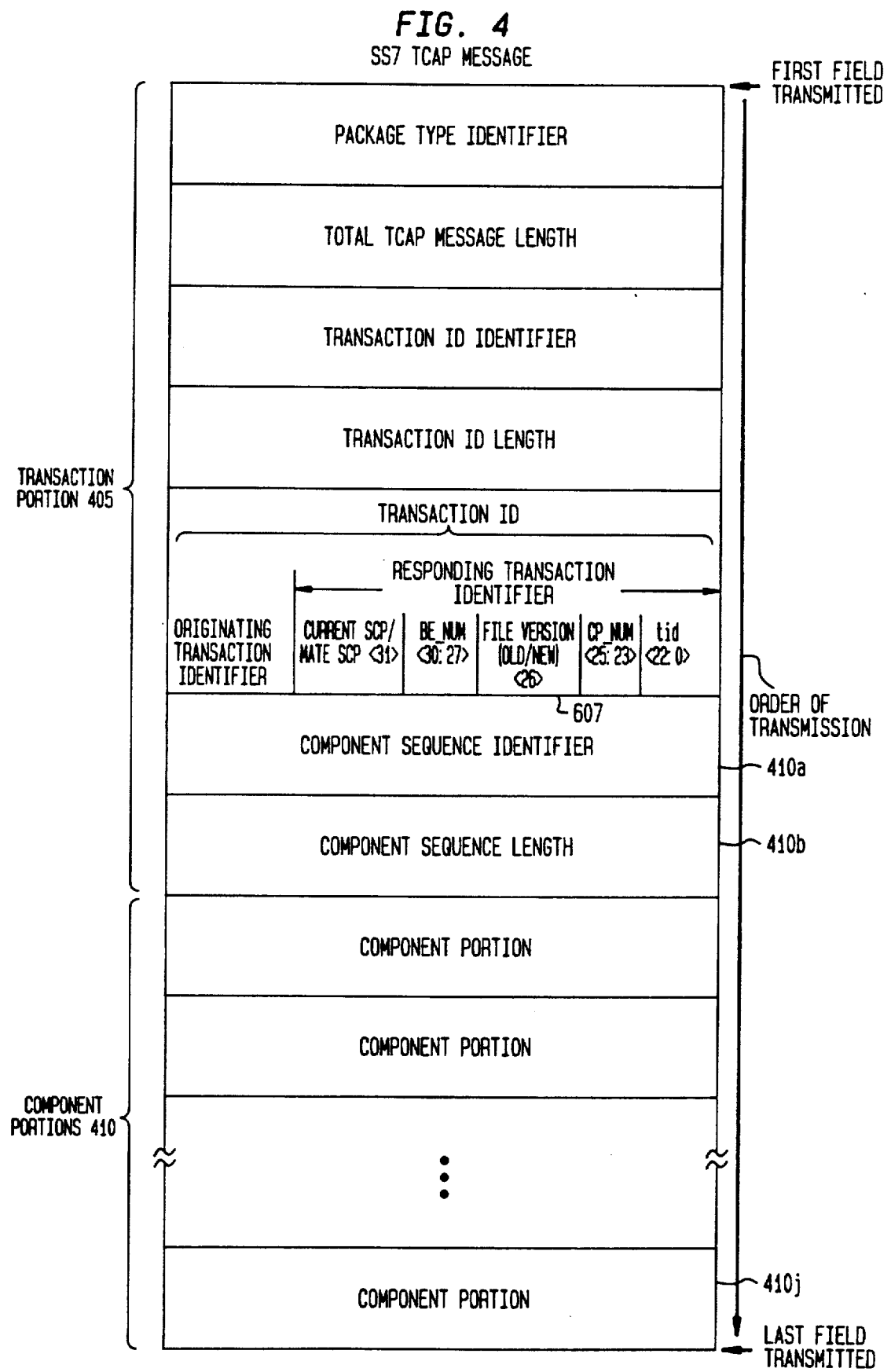

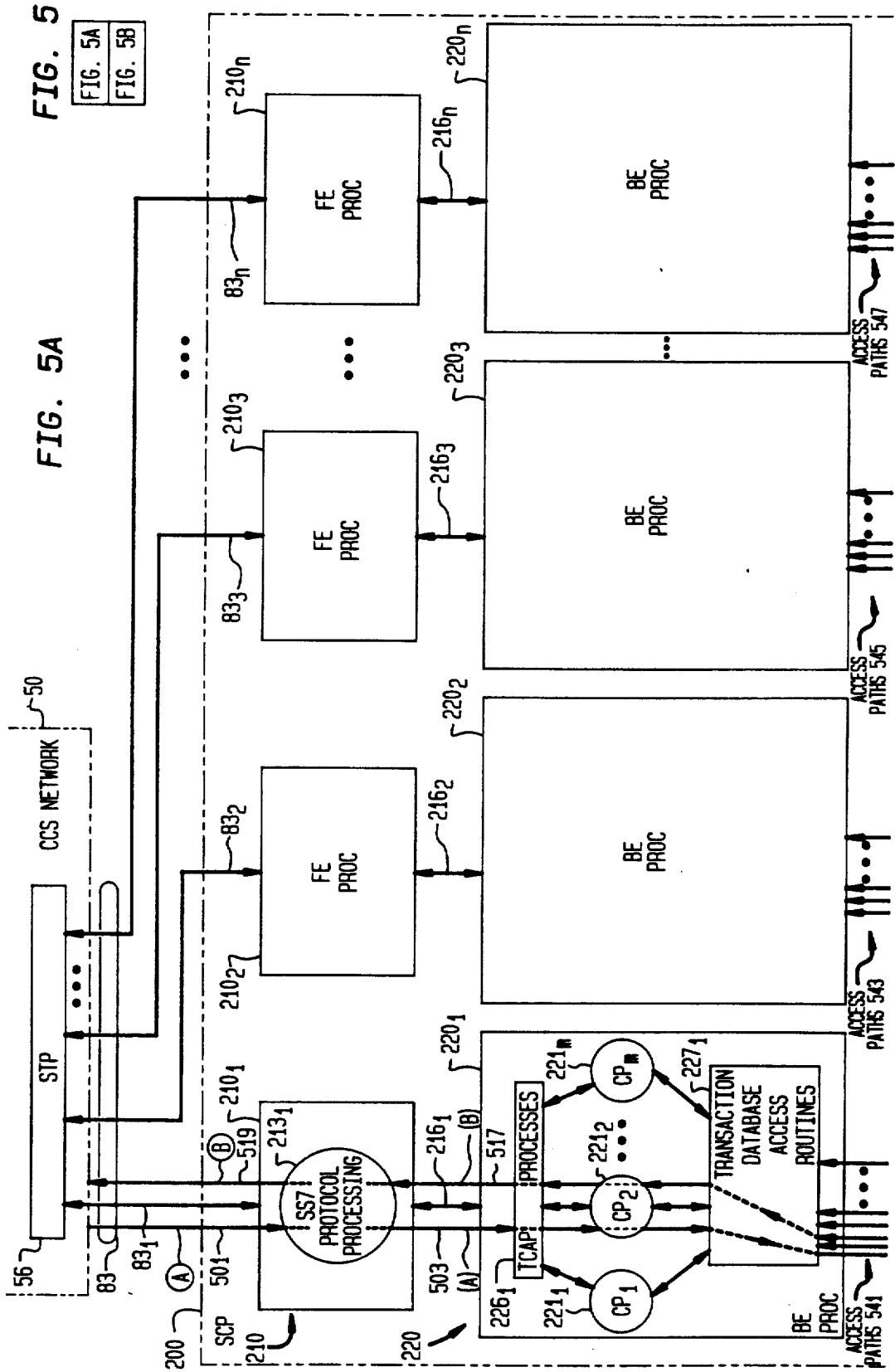

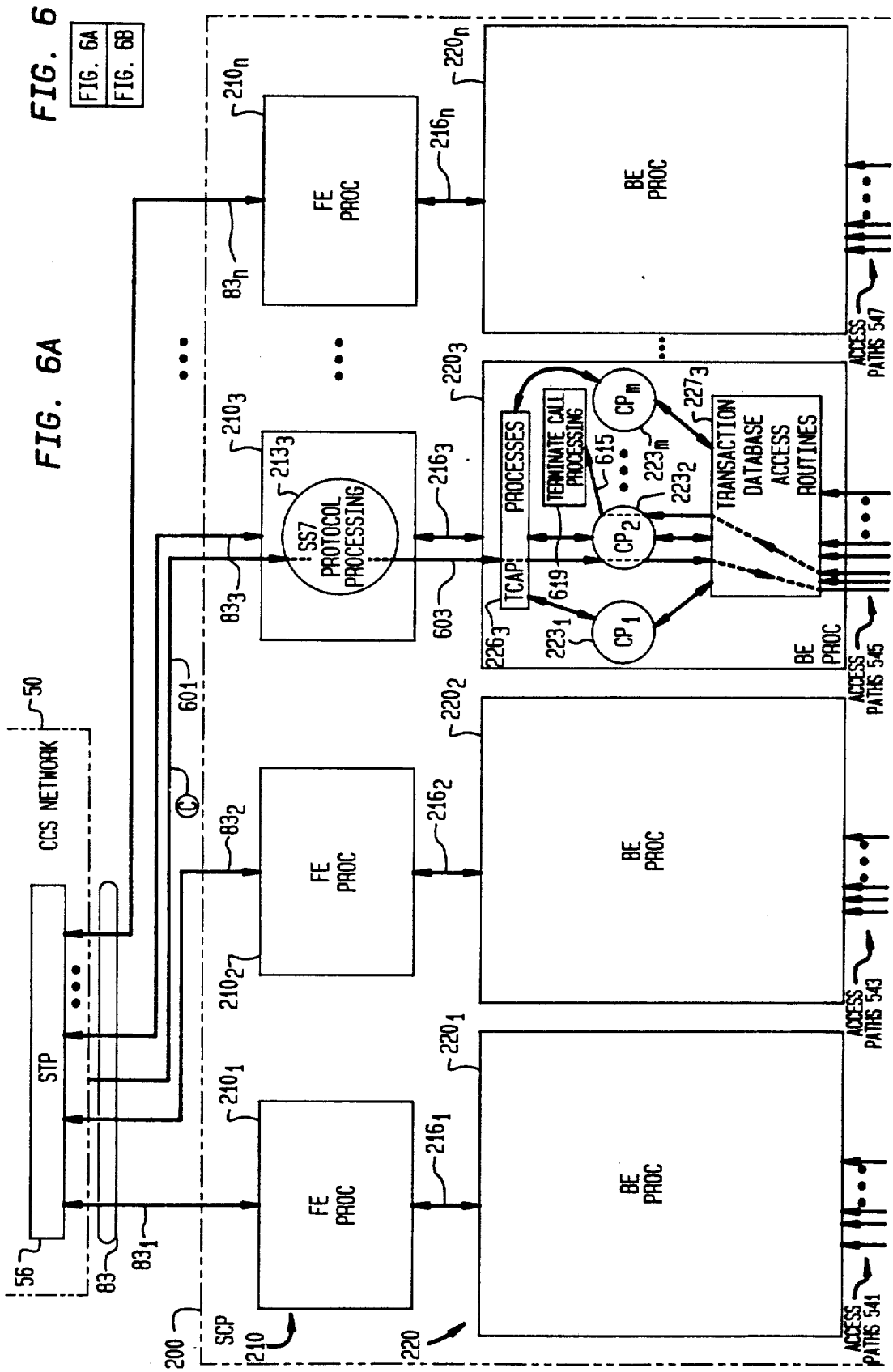

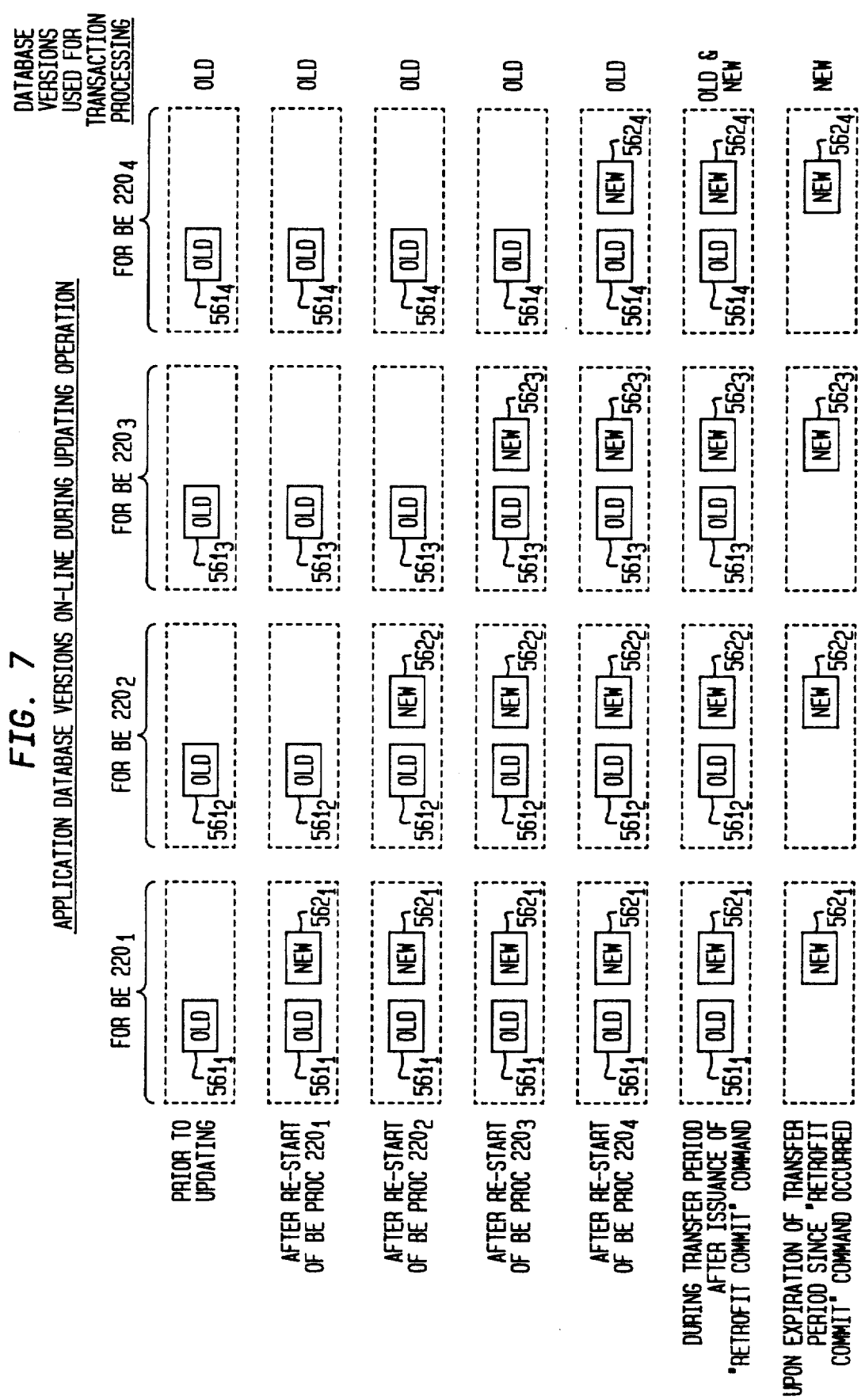

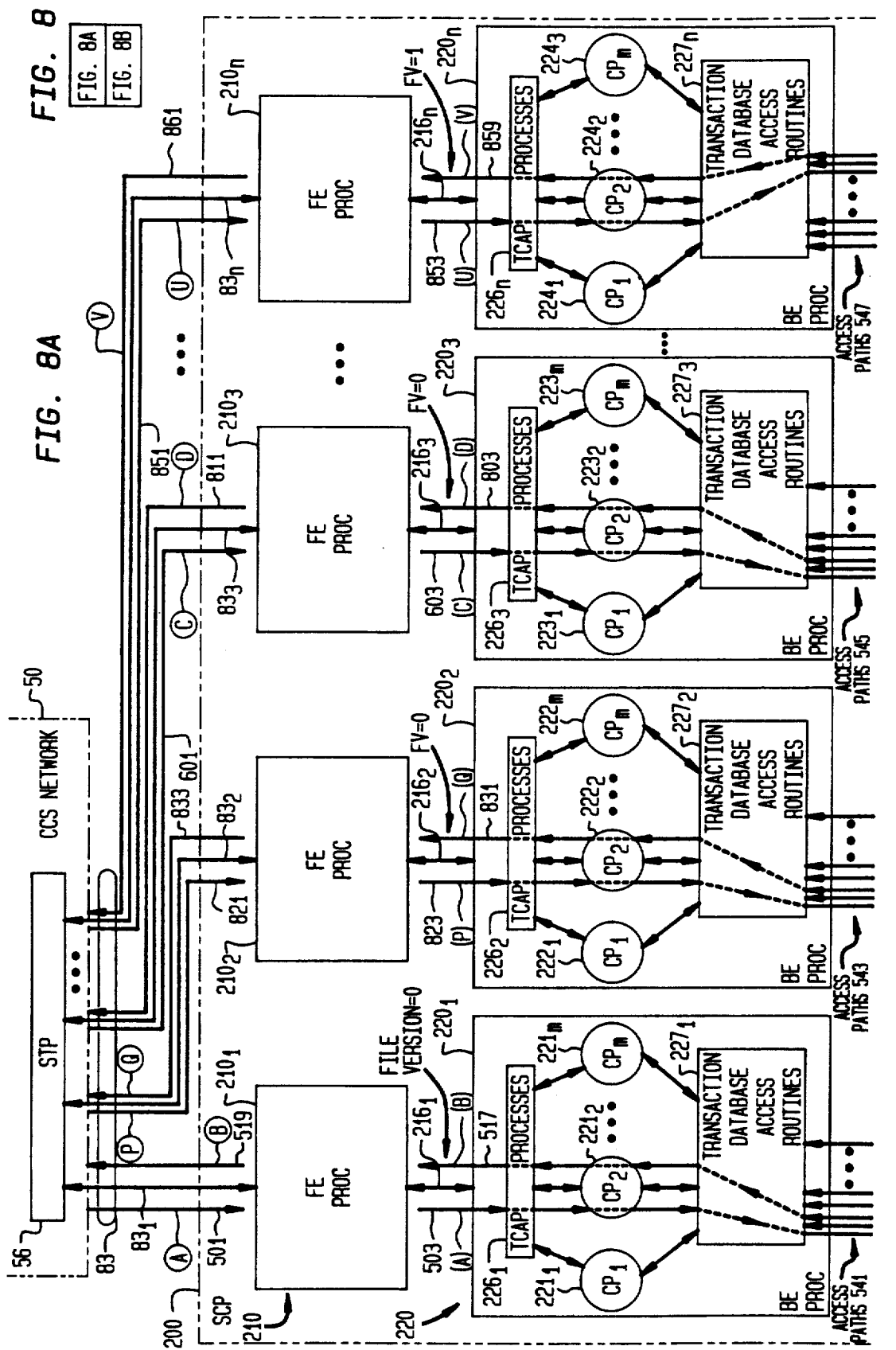

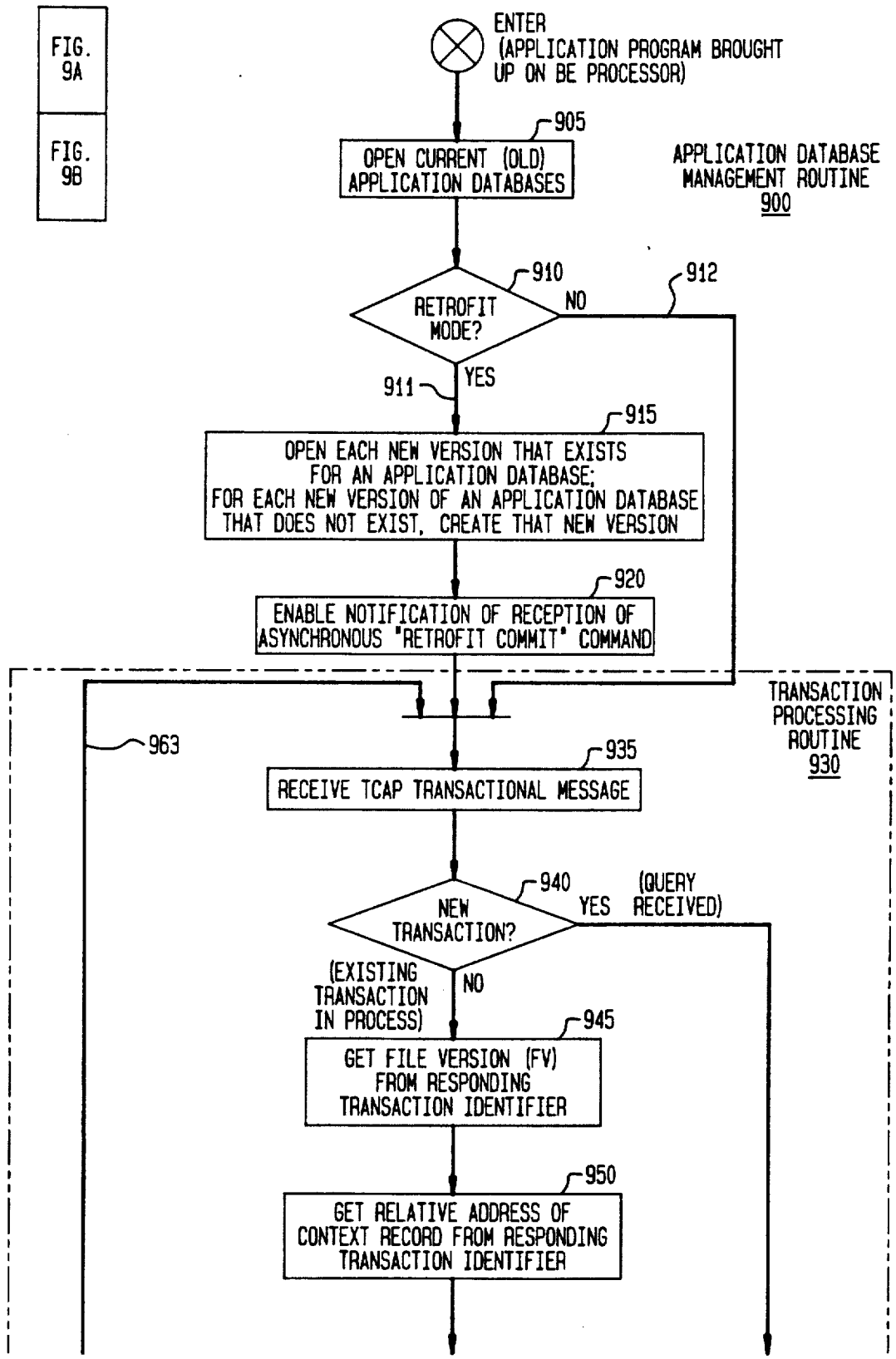

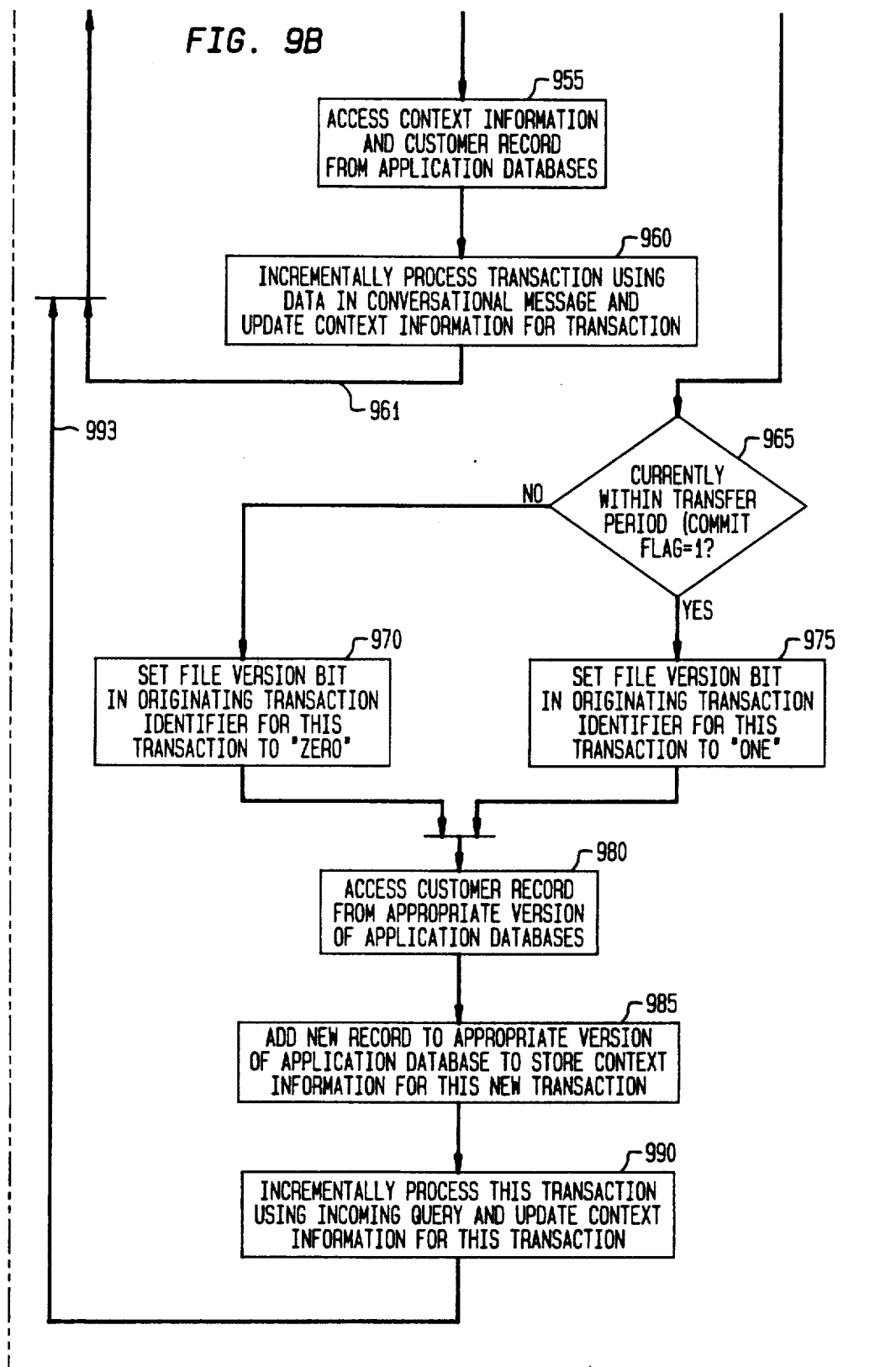

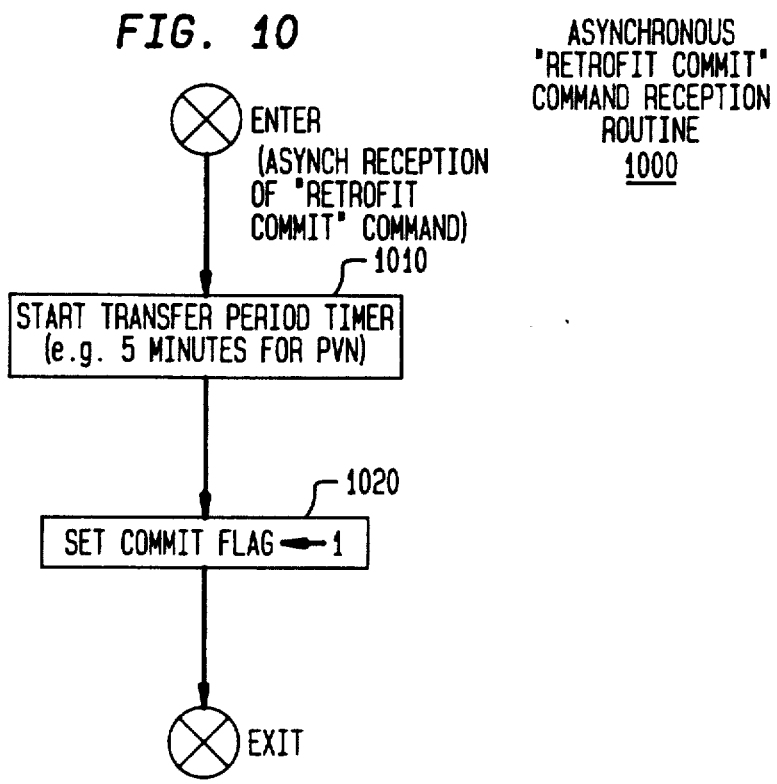
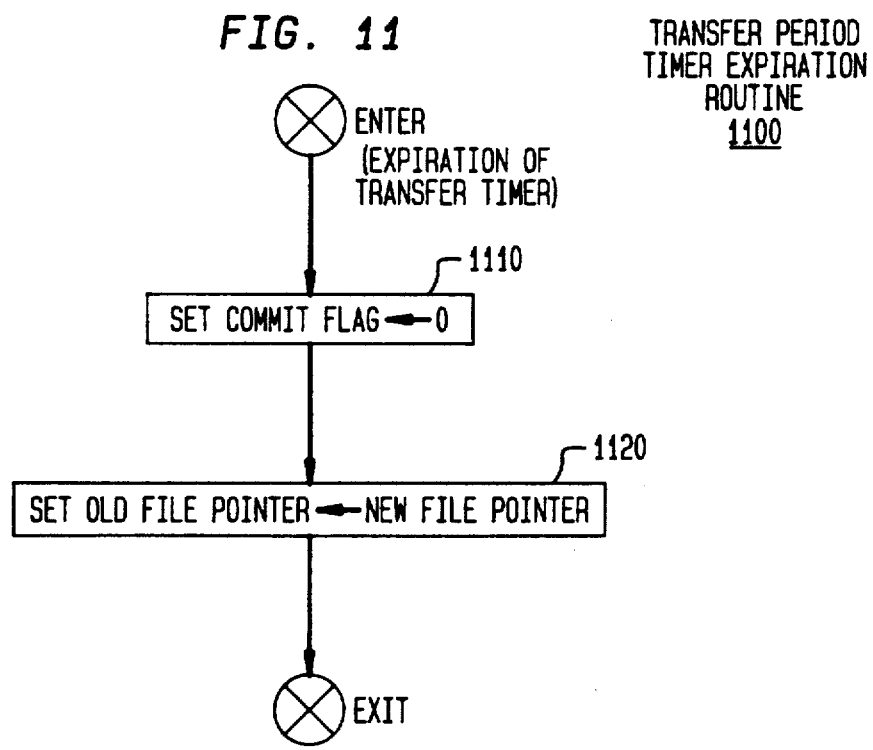

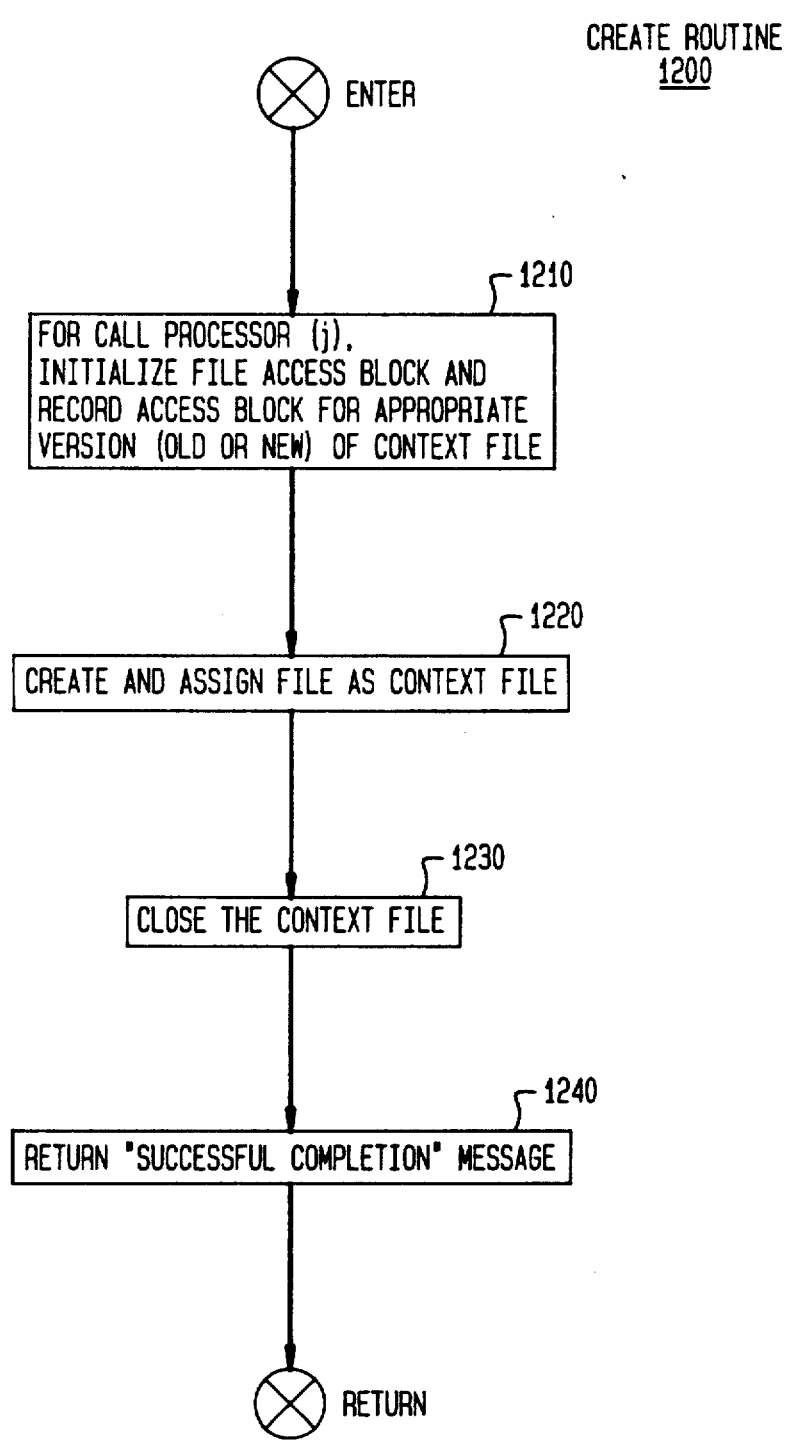

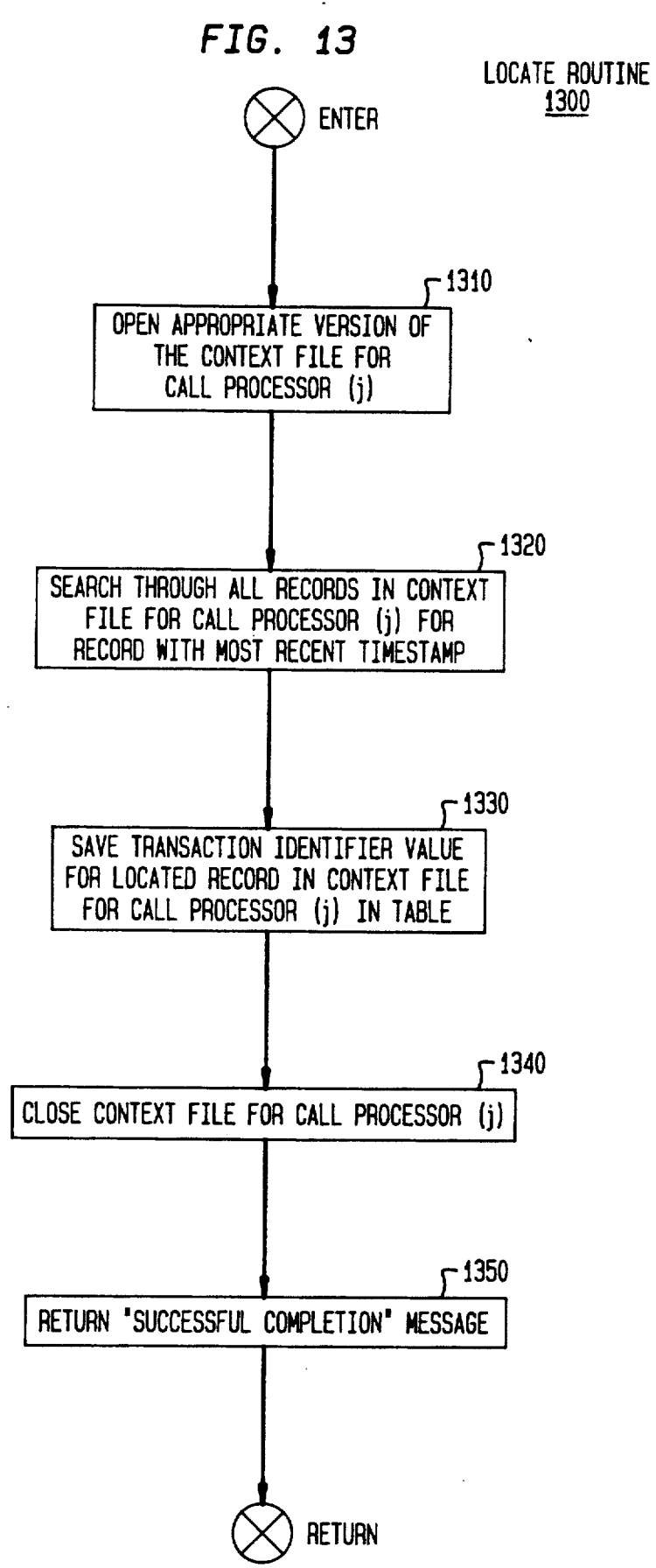

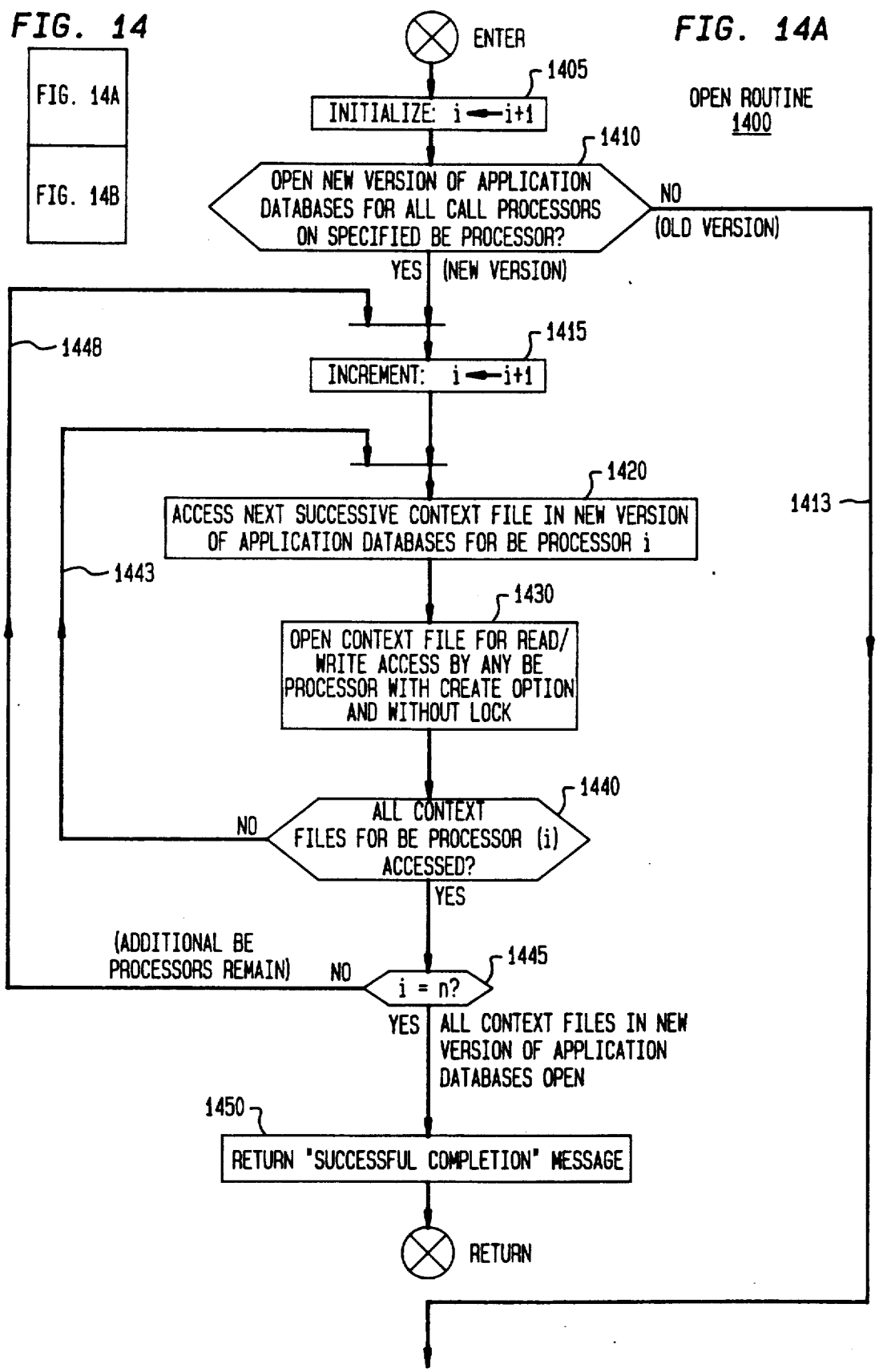

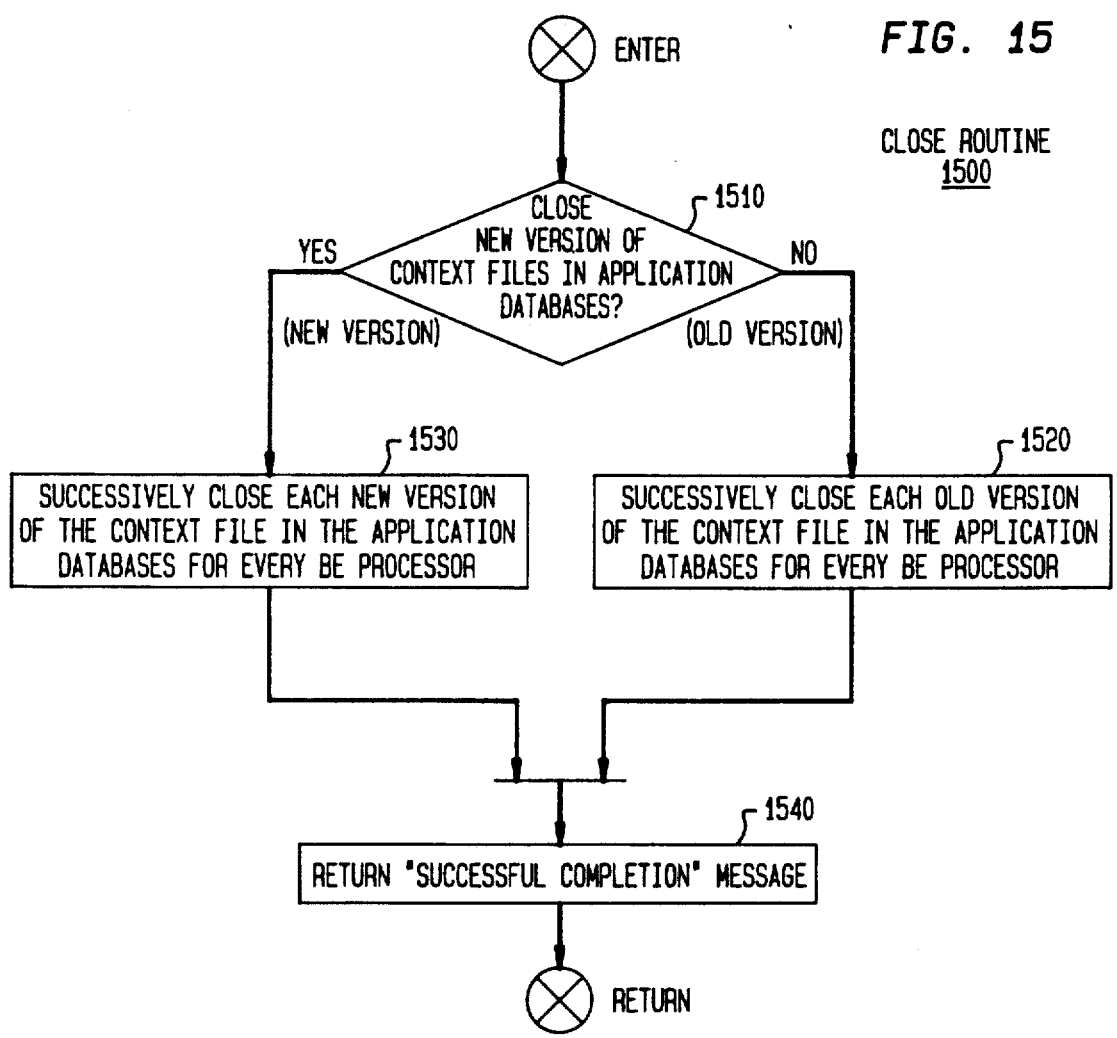

GET ROUTINE 1700

METHOD AND APPARATUS FOR UPDATING APPLICATION DATABASES USED IN A DISTRIBUTED TRANSACTION PROCESSING ENVIRONMENT

BACKGROUND OF THE DISCLOSURE

1. Field of the Invention

The invention relates to a method and apparatus for updating application databases in real time in a distributed transaction processing environment without adversely affecting the throughput of transaction processing or losing substantially any conversational transactions that are being processed while these databases are being updated.

2. Description of the Prior Art

Distributed real time transaction processing is currently finding increasing use as a method of implementing sophisticated high throughput application processing to provide local control over a process that occurs over a wide geographic territory and/or to serve many users who are dispersed over such a territory.

One form of distributed processing involves locating a processing element at each one of a number of local control points within the process being controlled and then permitting each such processing element to query, as the need arises, one or more databases, on a transactional basis, that are managed by and situated at a remotely located host computer in order to obtain additional information that is necessary for that local processor to provide its intended control function. This form of distributed processing is particularly suitable for controlling a telephone switching network to provide enhanced telephone services. In this regard, each local processor forms part of an equal access switch that has service switching point capability (such a switch will henceforth be referred to as an "SSP").

Specifically, whenever a telephone subscriber dials a telephone call that requires special routing, as in the case of an enhanced service such as illustratively "800" or calling card ("credit") type calls, a local switch that serves that subscriber first routes the call to the SSP. The SSP, in turn, suspends normal call processing for this call and launches a query as a packet over a common channel signaling ("CCS") network to a remotely located fault tolerant transaction processing system, hereinafter referred to as the service control point ("SCP"), that stores pre-defined call routing instructions for the desired enhanced service. In the case of an "800" type call, this information contains the called number. In response to the information contained within the query, the SCP performs a remote database translation operation into one or more databases of customer records for "800" service in order to fabricate a response that specifies how the call is to be ultimately routed, which in this case consists of a response that specifies an inter-exchange carrier and a pre-defined physical destination number that are both associated with the dialed "800" number. The SCP then embeds this routing information into a response message and thereafter transmits this response message as a packet back through the CCS network to the SSP that requested the information. Upon receipt of this response message, the SSP routes the call through the telephone network accordingly.

Depending upon the sophistication of the control being provided, distributed transactional processing systems may involve, in order of complexity, both query-response type transactions and/or conversational transactions.

In simple query-response type transactions, typified by those that occur in conjunction with "800" type call processing as explained above, a transaction merely consists of a query that has been transmitted by an SSP to an SCP and an associated response generated thereby and returned to that SSP. Inasmuch as the query contains sufficient input information to enable a remote database management system executing within the SCP to undertake a database translation operation and provide a complete response, the SCP requires no further information from either the SSP or therethrough the caller to provide the routing instructions needed to complete an "800" type call. Similar query-response type transactional processing occurs between an SSP and an SCP in processing credit card calls where the response message, rather than being a carrier selection and a physical destination routing number, consists of an instruction to the SSP to either route or terminate the call. Query-response type transaction processing also occurs in a variety of other relatively unsophisticated distributed processing applications, such as retail credit authorization and simple inventory control systems.

In instances where increasingly sophisticated control is desired, such as in controlling a telephone network to provide private virtual network ("PVN") or other such services, a customer record contains a decision tree rather than simple data values, such as carrier selection and physical routing numbers. The decision tree allows a processing system, e.g. the SCP, to interrogate the caller and, as determined by the information obtained therefrom and the logic specified within the tree, provide proper call routing information to furnish the specific service requested by the caller, e.g. provide a connection to a certain extension defined within a PVN. with such services, a query itself frequently does not contain sufficient information to enable the SCP to fully process through the decision tree. As such, the SCP conducts an interactive session with the caller to successively obtain whatever additional items of information the customer record specifies are needed to fully process the call and render a desired service. In particular, for such a service, the caller generally dials an appropriate telephone number to gain access to the desired service, e.g. a specific PVN. Once this occurs, the SSP associated with this caller fabricates a query to gain access to the service for that caller, then generates a packet containing the query and thereafter routes that packet over the CCS network to the SCP that handles the desired service. The SCP then performs a database access into a customer record to determine the next piece of needed information, e.g. a personal identification number PIN) and authorization code, that has to be obtained from the caller. Once this occurs, the SCP requests this piece of additional information by in effect questioning the caller. To do this, the SCP inserts an appropriate op code within a transaction capability application part (TCAP) message, and then transmits this message within a packet via the CCS network back to the SSP. In response to this op code, the SSP synthesizes a pre-defined voice message to prompt the caller to enter, by for example dialing digits on a telephone keypad, the desired Piece of additional information. Once the caller provides an answer, it is transmitted as a TCAP message within another packet by the SSP back to the SCP that requested it. In response to the answer, the SCP then re-accesses the customer record in order to determine the next piece of information it needs from the caller, and so on. Inasmuch as the nature of each additional piece of information often varies in response to the previous answer, the question and answer session occurring between the caller and the SCP is carried out on an interactive basis. Each question and answer session, henceforth referred to as a conversation with each TCAP message that carries part of the conversation being referred to as a conversational message, continues until the SCP has successively collected enough information from the caller via the SSP, as defined by the customer record, to fully process the customer record and by so doing determine how the call is to be routed. Once this occurs, the SCP sends a response message containing destination routing information as a packet back to the SSP which, in turn, routes the call accordingly. At this point the SCP has fully processed the transaction. As such, a conversational based transaction can be viewed as "Query—Conversation—. . . —Conversation—Response". Conversational type transaction processing may also occur in a variety of other relatively sophisticated applications, such as illustratively space reservation systems and factory automation and/or computer integrated manufacturing systems.

Essentially all computer databases need to be updated from time to time. This is particularly true for distributed processing systems that provide transactional processing using customer records, whether those records support query-response type transaction processing or conversational processing. For example, each customer record for PVN service contains data that defines the particular manner in which a customer's virtual telephone network is to act. By changing a customer record for PVN service, a customer has the option to change this network by adding or deleting extensions, to change the manner in which calls to existing extensions are to be handled, to specify within certain bounds what administrative data is to be collected for calls routed over this network or to make other changes that affect various features that can be selectively provided by the PVN service. Customer records that implement other types of enhanced telephone services, such as "800" and credit card type calls, that rely on remote database translation are also frequently changed as well. Inasmuch as customer records continually change as new service features are offered and are subscribed thereto or existing features that are no longer desired by individual subscriber(s) are deleted therefrom, the application databases that support each enhanced service undergoes constant change. It is therefore incumbent upon local telephone companies to always utilize the most recent version of the application databases within the SCP and to frequently update these databases in order to provide the proper enhanced services to their subscribers.

Traditionally, whenever an application database update needs to be performed in many data processing environments, an associated application program is merely terminated, the database is then updated and thereafter the application program is finally returned to current execution using the updated database, with this approach, the application program simply ceases to execute for whatever period of time is needed for the processing system to perform the update. In this regard, see E. A. Davis et al "Life Cycle Support and Update of No. 4ESS Software", *IEEE International Conference on Communications. ICC'82. The Digital Revolution*, 13-17 June 1982. Philadelphia, Pa. Vol. 13, pages 5G5.1-5G5.6 which discloses a similar technique for updating generic programs that control an electronic switching system. Unfortunately, when a generic program in a switch is to be updated in this manner, some traffic loss is likely to occur. Accordingly, to minimize the risk of any service disruption resulting from use of this technique, any such update would typically be accomplished during those times of the day when the traffic is expected to be the least and all traffic to the switch would be throttled back immediately before an update is to occur.

However, to assure that adequate on-line call processing capacity exists to handle unexpected peaks in transactional processing, e.g. call traffic for enhanced services, many distributed processing systems, and particularly those that process calls for enhanced telephone services on a high throughput transactional basis, should preferably remain on-line while their application databases are being updated. Although distributed processing systems, particularly those destined to control telephone networks to provide enhanced services, frequently contain redundant host processing systems, i.e. two loosely inter-connected SCPs with automatic mate switching to transfer call processing therebetween and replicated loosely coupled back-end processors within each SCP (as disclosed in detail in Boese et al United States patent application, "A REAL-TIME FAULT TOLERANT TRANSACTION PROCESSING SYSTEM", filed Nov. 25, 1987, assigned U.S. patent Ser. No. 07/125,463 and currently owned by the present assignee, now U.S. Pat. No. 5,084,816, issued Jan. 28, 1992 and also disclosed to a much lesser extent in J. O. Boese et al, "Service control point—Database for 800 Service", *Conference Record of Globecon '86: IEEE Global Telecommunications Conference December 1-4, 1986 Houston, Tex.*, Vol. 3, December 1986, pages 1316-1319), the removal of an entire processing system, i.e. an SCP, from service disadvantageously decreases the call processing capacity of the network during the time updating is occurring. Inasmuch as an unexpected peak in call traffic could occur while an update is occurring, the SCP should remain on-line with updating being performed on a real time basis in order to provide sufficient reserve call processing capacity to handle any such peak.

Although various well-known techniques exist for updating application databases in a distributed processing environment on a real-time basis, i.e. without halting on-going application processing, these techniques possess one or more drawbacks that limit or even negate their utility for use in updating application databases on a real-time basis that are used in providing enhanced telephone services.

In particular, one well-known updating technique for use with a distributed processing system employing loosely coupled processors having separate databases is disclosed in U.S. Pat. No. 4,718,002 (issued to R. W. Carr on Jan. 5, 1988). This technique first prioritizes the processors into a given order and establishes one of the processors as a control processor. Whenever one of the processors has developed an update message, the control processor instructs that one processor to broadcast the update message to all the other processors. In the event the control processor fails, then the next processor in order is selected to be the control processor.

Unfortunately, this technique is rather complex to implement.

Another technique exists that could be used for updating application databases within an SCP that contains replicated back-end processors. This technique involves successively taking down each individual back-end processor in the SCP, creating a new version of each application database on the "down" back-end processor, then directing that back-end processor to immediately process transactions through the new application databases and thereafter returning that back-end processor to service. Once this occurs, the old versions of these databases are merely deleted from storage. In effect, this technique simply substitutes, on a nearly instantaneous basis, a new version of each application database for a corresponding old version thereof. Unfortunately, this technique while being quite simple has a significant drawback associated with its use: merely substituting one version of an application database for another in any back-end processor and thereafter immediately directing that processor to only use the new version may cause the SCP to prematurely terminate transaction processing for a number of on-going conversational transactions and thereby lose traffic. In particular, an SCP utilizes an architecture having loosely coupled replicated back-end processors that all access a common shared disk farm that stores the application databases for each of these processors. With this arrangement, different conversational messages that collectively form a given conversational transaction are typically routed to different back-end processors that provide incremental processing for that transaction. In order to effectively implement conversational transaction processing with this architecture, each processor that is to provide any such incremental processing utilizes a transaction identifier field embedded within each conversational message to access a specific entry in a context file within the application database(s) associated with a particular back-end processor that initiated the entire processing of that transaction. This technique is fully described in my prior United States patent application "A METHOD FOR HANDLING CONVERSATIONAL TRANSACTIONS IN A DISTRIBUTED PROCESSING ENVIRONMENT", filed Aug. 8, 1988, assigned U.S. patent Ser. No. 229,241 and currently owned by the present assignee, now U.S. Pat. No. 5,089,954 issued Feb. 18, 1992. Now, owing to the inclusion of new features in an given service, an updated application database may be configured in a significantly different format than the old version thereof. Therefore, the newly updated application database that would be accessed by a back-end processor in the SCP may be incompatible with the old version of the same database that would otherwise, in the absence of being updated, be accessed by that processor. Consequently, if a conversational transaction is being processed within an SCP using the old version of the application database and then an update occurs causing the remainder of the processing of that transaction to be performed using the newly updated version of that database, then, due to incompatibility between the versions, the SCP will likely be unable to process the next or a subsequent conversational message in that transaction and will accordingly drop the entire transaction thereby disadvantageously terminating the call.

Thus, a need exists in the art for a method for updating application databases in real-time in a distributed transaction processing system that is simple to implement, does not appreciably adversely affect the throughput of conversational transaction processing and does not cause substantially any loss of transactions while updating is occurring. Such a method would advantageously find use within a distributed processing system that controls a telephone signaling network to provide sophisticated enhanced services and specifically within an SCP used in such a network which employs an architecture of loosely coupled replicated back-end processors that all access application databases residing on a common shared disk farm and which provides these enhanced telephone services through conversational transaction processing.

SUMMARY OF THE INVENTION

The deficiencies of the updating techniques disclosed in the art and applicable to distributed processing systems are advantageously solved in accordance with the teachings of my present invention. Specifically, through my invention, prior to the start of a transfer time period, application processing is temporarily terminated on each transaction, e.g. back-end, processor on the system during which a new version of each application database associated with that processor is loaded onto a memory device, e.g. a shared disk farm, which is accessible by that processor. Thereafter, application processing is brought "up" on this processor. Once this occurs for every such processor on the system, both old and new versions of the same application databases will exist on the memory device. However, at this point, each processor processes transactions using only the old versions of the application databases. At some point thereafter, a transfer time period is initiated, such as by issuing a suitable command (e.g. "retrofit commit") to each such processor. Once this period is underway, all transactional messages associated with transactions that were initiated after the start of this period are processed using only the new versions of the application databases, while all transactional messages that are associated with transactions that were initiated prior to the start of this period are processed using the old versions of these databases. The duration of the transfer time period, illustratively five minutes for PVN service, is chosen to be sufficiently long such that conversational transactions that are in process prior to the start of the period will expire prior to the expiration of the period. Consequently, conversational transaction processing will migrate, through expiration of these previously initiated in-process transactions, from the old to the new versions of the application databases during the transfer time period. At the expiration of this period, no such transactions will be processed using the old versions of the application databases, at which time, this version can be deleted, if desired, from the memory device. Since the transactions that were initiated before and after the start of the transfer time period are completely processed using different versions of the application databases, no sequential accesses will occur for the same transaction into both database versions thereby avoiding premature termination of transaction processing for any such transaction.

In accordance with the teachings of a preferred embodiment of the invention, the system has an originating node, e.g. an SSP, with the SCP being a responding node and a communication path, such as through a CCS network, extending between these nodes. The SSP initiates transaction processing by supplying queries for enhanced telephone service to the SCP For the first conversational message generated by the SCP for a transaction, a field, e.g. the file version bit, situated within the message and specifically within an originating transaction identifier contained therein, is set by the SCP and specifically the BE processor that generates that message to a value that specifies which version of the application databases is to be used by any BE processor within the SCP to process that transaction. Upon receipt of the conversational message from the CCS network, the SSP merely reflects the value of the originating transaction identifier including the value of file version bit, into a responding transaction identifier that will be transmitted within the next successive conversational message in this transaction back to the SCP over the CCS network. With the file version bit situated within the responding transaction identifier and having the same value as that which was sent to the SSP, the SCP is able to access the correct version of the application databases that is needed to incrementally process this next successive conversational message associated with this transaction. The SCP then supplies the same value of the file version bit within the responding transaction identifier to the SSP for each successive conversation in the transaction until the SCP finally sends a response message to the SSP thereby concluding conversation transaction processing for this transaction.

Furthermore, since the SCP described herein employs an "n+1" architecture which necessitates that "n" processors be in an active processing state at any one time, only one back-end processor in the SCP is sequentially brought "down" at any one time in order to load the new version of its application databases thereby allowing "n" back-end processors to remain in active service.

BRIEF DESCRIPTION OF THE DRAWINGS

The teachings of the present invention can be readily understood by considering the following detailed description in conjunction with the accompanying drawing, in which:

FIG. 2 shows the correct alignment of the drawing sheets for FIGS. 2A and 2B;

FIGS. 2A and 2B collectively depict a block diagram of SCP 200 shown in FIG. 1;

FIG. 3 diagrammatically depicts message flow that would be expected to occur between an SCP and an SSP during a typical conversational transaction;

FIG. 4 shows the constituent parts of a SS7 TCAP message as it pertains to the present invention;

FIG. 5 shows the correct alignment of the drawing sheets for FIGS. 5A and 5B;

FIGS. 5A and 5B collectively and diagrammatically show illustrative message flow that could occur within SCP 200, shown in FIGS. 2A and 2B, for processing a portion of the conversational transaction, such as that shown in FIG. 3, before the application databases are updated;

FIG. 6 shows the correct alignment of the drawing sheets for FIGS. 6A and 6B;

FIGS. 6A and 6B collectively and diagrammatically show illustrative message flow that could occur within SCP 200, shown in FIGS. 2A and 2B, for processing the remainder of the conversational transaction shown in FIGS. 5A and 5B shortly after the application databases are updated using a typical "substitution" technique known in the art;

FIG. 7 shows the versions of the application databases that are on-line and used at various stages during an update operation performed in accordance with the teachings of my invention as used in an SCP that illustratively contains four back-end processors;

FIG. 8 shows the correct alignment of the drawing sheets for FIGS. 8A and 8B;

FIGS. 8A and 8B collectively and diagrammatically depict illustrative message flow that could occur within SCP 200, shown in FIGS. 2A and 2B, for processing an illustrative conversational transaction similar to that shown in FIGS. 5A and 5B and which extends into a transfer period as well as the message flow that occurs for processing a portion of a new transaction that started during this period, all while this SCP is being updated in accordance with my invention;

FIG. 9 shows the correct alignment of the drawing sheets for FIGS. 9A and 9B;

FIGS. 9A and 9B collectively show a flowchart of Application Database Management Routine 900 that executes within each BE processor in SCP 200 shown in FIGS. 2A and 2B;

FIG. 10 shows a flowchart of Asynchronous "Retrofit Commit" Command Reception Routine 1000;

FIG. 11 shows a flowchart of Transfer Period Timer Expiration Routine 1100;

FIG. 12 shows a flowchart of CREATE Routine 1200;

FIG. 13 shows a flowchart of LOCATE Routine 1300;

FIG. 14 shows the correct alignment of the drawing sheets for FIGS. 14A and 14B;

FIGS. 14A and 14B collectively show a flowchart of OPEN Routine 1400;

FIG. 15 shows a flowchart of CLOSE Routine 1500;

To facilitate understanding, identical reference numerals have been used, where possible, to designate identical elements that are common to the figures.

DETAILED DESCRIPTION

The teachings of the present invention can be used in updating an on-line application database(s) on a real time basis that exists in a wide variety of distributed processing systems and particularly such a database(s) used in supporting a high rate of conversational transaction processing. For example, such systems include space, e.g. airline, reservation systems; retail credit processing systems; automated point of sale and inventory systems; automated teller, remote banking and automated electronic funds transfer systems; and factory automation and/or computer integrated manufacturing systems, as well as a multitude of other distributed control systems that employ transaction processing. One such distributed control system that is ideally suited for the present invention is a real time fault tolerant conversational transaction processing system that is used to control the provision of enhanced telephone services, such as private virtual networks, through a telephone signaling network. Hence, for the sake of brevity, the present invention will be discussed in the context of its implementation within a service control point (SCP) that implements the signaling system 7 (SS7) protocol in such a telephone signaling network. Within this context, the SCP is a conversational transaction processing system that processes packets supplied over any link existing within a link set in a common channel signaling (CCS) telephone network that connects the SCP to a signaling transfer point (STP) using the SS7 protocol. Clearly, after reading the following description, those skilled in the art will readily appreciate how the teachings of the present invention can be incorporated into other distributed processing systems that employ conversational and/or non-conversational transaction processing.

To clearly understand the basic operation of a telephone signaling network and the advantages conveyed thereto by the present invention, the following discussion will first discuss salient aspects of the network and primarily center on one of the simplest network services: "800" number calls, and then focus on calls for enhanced services, such as private virtual networks (PVN), that rely on conversational transaction processing. Next, the discussion will turn to addressing a deficiency associated with the provision of enhanced network services through an SCP using conversational transaction processing. Thereafter, the discussion will conclude with a detailed explanation of the present invention and the manner by which it advantageously eliminates this deficiency.

I. Common Channel Signaling (CCS) Network

Figure 1:
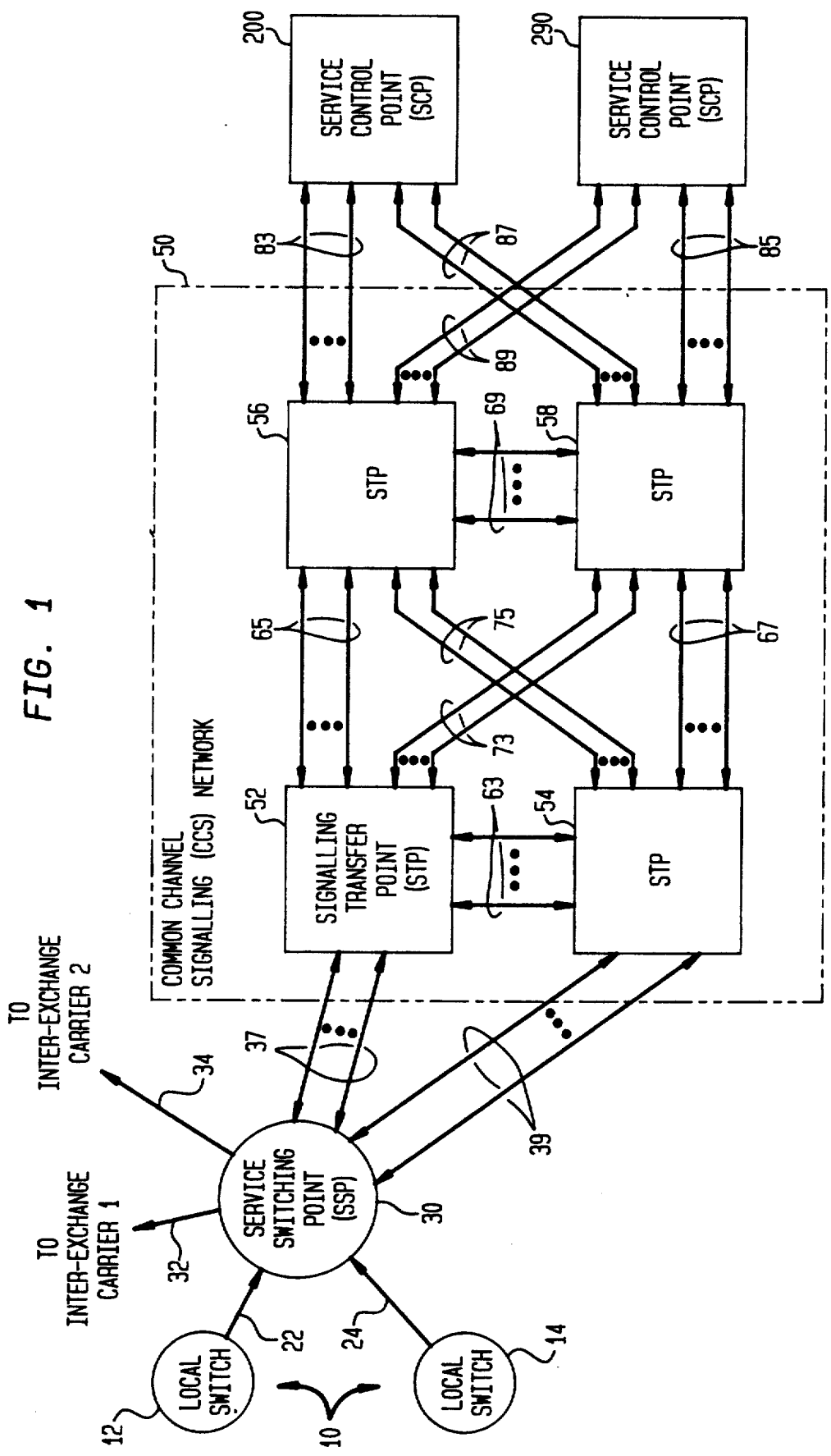
FIG. 1 is a simplified diagram of the architecture of a telephone signaling network that utilizes signaling system 7.

In particular, FIG. 1 shows a simplified diagram of an illustrative architecture of a telephone signaling network that utilizes signaling system 7 (SS7), employs transaction processing and is described in detail in Boese et al United States patent application, "A REAL-TIME FAULT TOLERANT TRANSACTION PROCESSING SYSTEM", filed Nov. 25, 1987, assigned U.S. patent Ser. No. 07/125,463 and currently owned by the present assignee, now U.S. Pat. No. 5,084,816, issued Jan. 28, 1992.

In general, this network provides special telephone call destination routing information to support a variety of enhanced network services, such as illustratively "800" and calling card calls, and other more sophisticated services, such as private virtual networks (PVN). This routing information is obtained through remote database translations, using caller supplied information such as, in the case of "800" or credit card calls, a called number or a credit card number, to appropriately access one or more databases that are embedded within a telephone signaling network.

Now, assume for the moment that a caller dials a call for a network service, such as an "800" number. The caller (not shown) is generally connected to a local switch, such as local switch 12 or 14. An "800" telephone number is actually a logical telephone number. To route such a call to its proper destination, the "800" number must be translated to an appropriate destination routing number to which the call can be subsequently routed. The specific destination routing number is specified in a customer record stored within one or more databases residing within a service control point (SCP). This record typically contains one and often more destination routing numbers and associated inter-exchange carrier selections that are associated with a dialed "800" number and the manner in which one of these destination routing numbers and its associated inter-exchange carrier is to be selected, e.g. time of day, day of month, originating numbering plan of the caller and the like. An SCP is an on-line real time fault tolerant transaction processing system that provides call processing information (responses) in response to queries received via STPs connected within the signaling network. This call processing information includes call routing instructions, and for enhanced network services, as discussed below, instructions to obtain additional information from a caller. In particular, several different database applications can be concurrently executing on an SCP. To understand the operation of the network, the following discussion addresses one such application, "800" service.

Whenever a local switch, typified by either local switch 12 or 14, receives an "800" call, this switch routes the call onward, either through trunk 22 or through trunk 24, respectively, to an equal access switch, located either at a local office or elsewhere, that has service switching point capability (such a switch will be collectively referred to as an "SSP"), such as SSP 30. The function of the SSP is to first recognize an incoming call as one that requires special handling—such as "800" number calls, then suspend normal call processing for this call, thereafter obtain appropriate routing instructions through the telephone signaling network and finally route the call according to the resulting instructions. Specifically, in response to an "800" number call, SSP 30 fabricates a query in the form of a packet. This query contains the called "800" number and a request for a destination routing number associated with the dialed "800" number and a designation of a specific inter-exchange carrier, such as inter-exchange carrier 1 or 2, that is to carry this call. This packet also contains a network address of the SSP, i.e. SSP 30, that originated the query. Once this packet is generated, it is transmitted through regional common channel signaling (CCS) network 50 to an appropriate SCP, such as SCP 200 or SCP 290, which processes the packet and provides the desired routing information as a response message. Inasmuch as the transactions associated with "800" calls merely contain a query and a subsequent response, they can be viewed as "Query—Response" type transactions. Other transactions which are associated with enhanced network services, such as PVN, additionally contain one or more interactive conversations between an SCP and an SSP, and, as discussed in detail below, take the form of "Query—Conversation—. . . —Conversation—Response" and are referred to as conversational transactions.

Generally speaking, the CCS network consists of a multi-level hierarchy of signaling transfer points (STPs) which primarily act as packet switches to: carry a message, in this case an SS7 packet, from an "originating" SSP to a particular "destination" SCP; carry, when appropriate for enhanced network services, one or more conversational messages between the destination SCP and the originating SSP; and then carry a packet containing a response message (call routing instructions) from that SCP back to the originating SSP which, in turn, routes the call according to the call routing instructions. As shown, CCS network 50 contains STPs 52, 54, 56 and 58 which are situated at different geographic locations within a given service region. STPs 52 and 54 receive incoming packets from SSP 30 for subsequent routing through the CCS network. As a result, these STPs function as "originating" STPs. STPs 56 and 58 receive incoming packets that have been routed through CCS network 50 for delivery to SCP 200 or 290 for appropriate processing therein. As such, STPs 56 and 58 function as "destination STPs".

In actuality, CCS network 50 typically contains more than two originating and two destination STPs, and more than two STP levels wherein one or more levels of STPs are situated between the originating and destination STPs to provide additional packet routing therebetween. Each individual SSP, STP and SCP that exists within a signaling network is often referred to as a node.

In conjunction with this network, a multi-layered protocol is used to provide point-to-point communication between different nodes in the signaling network—such as between an SSP and an STP, between separate STPs, and between and STP and an SCP. This protocol, hereinafter referred to as signaling system 7 (SS7), is the ANSI (American National Standards Institute) implementation, as recommended by the ANSI T1X1.1 working Group, of the signaling system 7 standard initially promulgated by CCITT. This protocol includes mechanisms, such as error detection and correction, to insure reliable transfer of signaling information between two points in a CCS network in the presence of transmission disturbances or a network (link or node, e.g. STP or SCP) failure. In implementing this protocol, each pair of nodes is inter-connected by a number of separate signaling links, specifically up to sixteen separate bi-directional physical links, that collectively form a link set. In the case of a link failure, the protocol diverts and distributes traffic from a failed link in the set to and approximately equally among all the remaining active links in the set. The software that implements SS7 executes in every node within the network in order to reliably transfer packets therebetween. within this protocol, levels one, two and three respectively define appropriate physical, electrical and functional characteristics of a signaling data link; functions and procedures relating to transferring signaling messages over an individual signaling link (e.g. delimitation of signaling units by flag insertion, error detection using check bits and explicit sequence numbers); and software based transport mechanisms and procedures that are common to and independent of the operation of individual signaling links. Application messages, such as queries to an SCP and responses therefrom, which pass between different nodes within a CCS network exist at the fourth (and when used higher) levels of the SS7 protocol which is referred to as the transaction capability application part (TCAP). Inasmuch as the inventive method utilizes a feature provided by the TCAP layer, the remaining discussion as it pertains to SS7 will be limited to TCAP.

Specifically for use with SS7, SSP 30, as shown in FIG. 1, is inter-connected by link sets 37 and 39 to respective originating STPs 52 and 54 within CCS network 50. Within CCS network 50, originating STPs 52 and 54 are themselves inter-connected by link set 63 and are redundantly inter-connected to destination STPs 56 and 58 by link sets 65, 67, 73 and 75. STPs 56 and 58 are themselves inter-connected by link set 69 and are redundantly inter-connected to respective SCPs 200 and 290 by link sets 83, 85, 87 and 89. Each link set carries the same address. By virtue of the SS7 protocol, every node assigns outgoing packets among various active links in a link set so that these packets are distributed on an approximately even basis among all these links.

Once SSP 30 formulates a query, this SSP routes the associated packet that contains this query and appropriate header information through an available active link in either link set 37 or 39, to an originating STP, i e. either STP 52 or 54, respectively, located within CCS network 50. The originating or any subsequent STP determines, using internal global title translation tables, an address of a particular SCP, such as SCP 200, which contains the appropriate databases necessary to provide the requested call routing instructions, e.g. the specific SCP which contains a copy of the customer record for a dialed "800" number. This address is then inserted as a routing field that forms part of the header of the packet. Thereafter, the packet is routed from the originating STP to a destination STP within CCS network 50. Each STP that receives this packet examines its routing field and routes the packet accordingly. Once the destination STP receives the packet, it routes the packet to the particular SCP specified within the header. To process an "800" call, the SCP performs an associated database look-up operation to formulate the desired call routing instructions. After this has occurred, the SCP fabricates a packet that contains both the call routing instructions as a response message and a header that specifies the address of the SSP that originated the original query. Once the SSP receives this packet, it routes the dialed "800" call according to the routing instructions, i.e. the SSP routes the dialed call to the specified destination routing number via a specified inter-exchange carrier, such as inter-exchange carrier 1 or 2, via respective trunks 32 o 34.

For a detailed explanation of SS7, the reader is referred to the following material: *Bell Communications Research Specification of Signaling System 7, Technical Reference TR-NPL-000246*, Issue 1, Volume 1, 1985 (*1985, Bell Communications Research) which is hereinafter referred to as the "Bellcore SS7 Specification"; and M. G. walker, "Get inside CCITT signaling system No. 7", *Telephony*, Mar. 10, 1986, pages 72–77.

II. Service Control Point Architecture

Figure 2B:
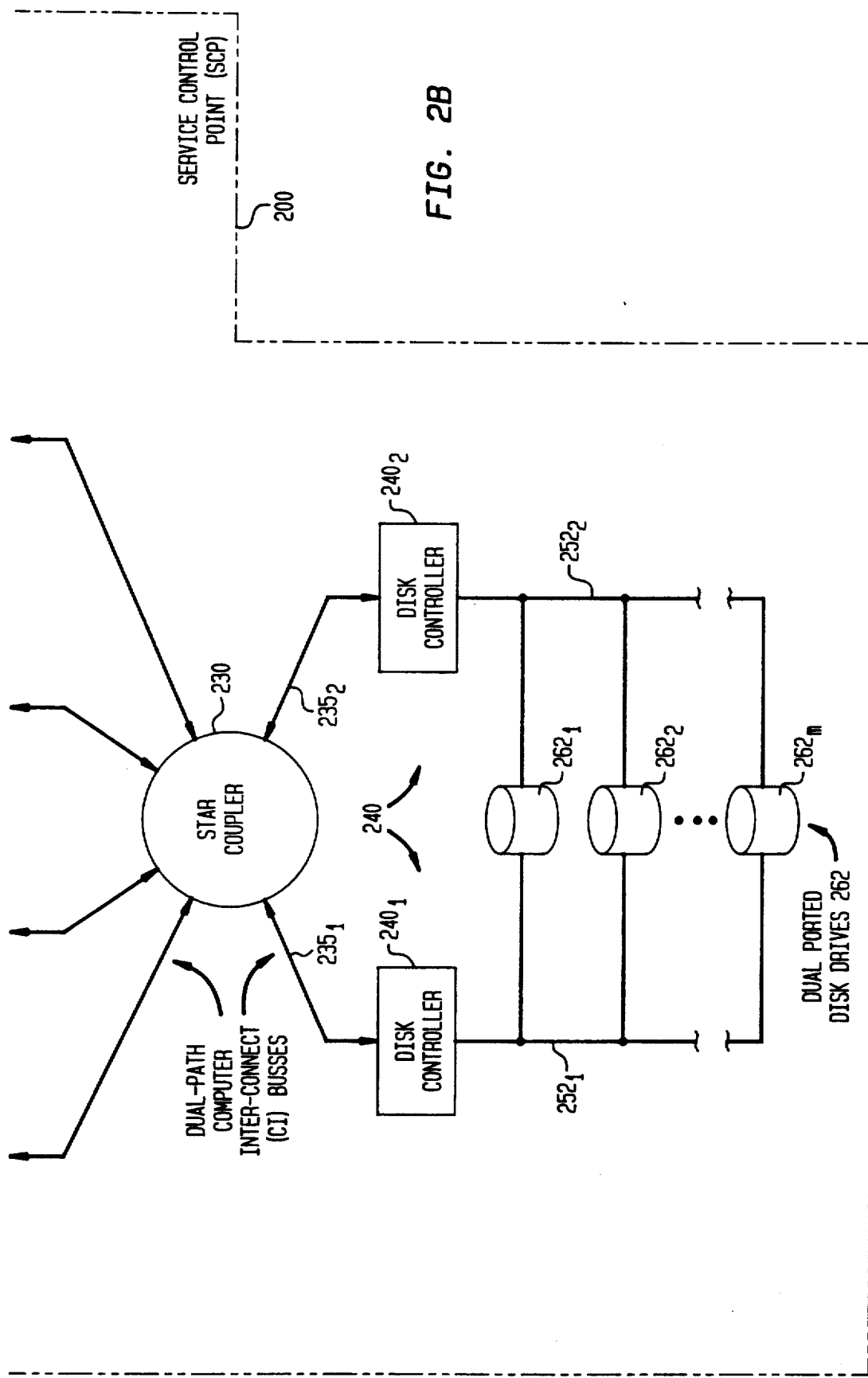

A block diagram of the architecture of an SCP, illustratively SCP 200, is depicted in FIGS. 2A and 2B; the correct alignment of the drawing sheets for these figures is shown in FIG. 2. This architecture is also described in detail in the above-noted Boese et al United States patent application entitled "A REAL-TIME FAULT TOLERANT TRANSACTION PROCESSING SYSTEM" filed Nov. 25, 1987, assigned U.S. patent Ser. No. 07/125,463 and currently owned by the present assignee.

As shown in FIGS. 2A and 2B, SCP 200 contains a cluster of processors (inter-connected front- and back-end processors) that appears to the CCS network as a single node. Essentially, SCP 200 consists of from three to five back-end processors that process transactions using databases stored on a shared disk farm and provide appropriate conversational messages and responses to queries launched from SSPs. Each back-end (BE) processor is connected to and communicates, via a corresponding front-end (FE) processor, with CCS network 50 to receive individual incoming queries from the network, transmit and receive conversational messages to and from the network and transmit responses to the network. In processing "800" calls, each associated query is separately processed by a corresponding BE processor. All the front- and back-end processors are loosely coupled together for purposes of processor synchronization and re-assignment. One of the back-end processors co-ordinates the operation of all the FE and BE processors so that individual front- and/or back-end processors as well as software, including application (subsystem) software, executing therein can be gracefully brought into and out of service. As a result of this co-ordination, SCP 200 appears as a single node to the CCS network, specifically STPs 56 and 58, even though different packets (e.g. containing different queries or conversational messages) arriving on different links connected to the SCP may, in fact, be processed essentially simultaneously by different processors. As a result of packet distribution occurring among all the active links in a link set, all these links simultaneously carry an approximately equal number of packets which are, in turn, processed by the FE-BE processor pairs connected thereto. In the event any physical link in a link set or either a FE or BE processor connected thereto fails, then that link is declared to be out of service by the SS7 protocol. As a result, the SS7 protocol merely re-distributes all subsequent traffic (packets) approximately evenly among all the remaining active links in the set until such time as the fault is cleared. When the previously failed link is brought back into active service, the protocol once again re-distributes packets on an approximately even basis among this link and the other active links. As the result of this packet re-distribution, there is advantageously no need to connect a fault tolerant processor to each physical link as either the FE or BE processor.

As shown and discussed above, SCP 200 is connected to STPs 56 and 58 by respective link sets 83 and 87. Link set 83 contains multiple links $83_1, 83_2, 83_3, \ldots, 83_n$. Link set 87 contains multiple links $87_1, 87_2, 87_3, \ldots, 87_n$ (where here "n"$\leq 8$). within SCP 200, every pair of corresponding links in both link sets is connected to a separate processor within FE processors 210. In this manner, each front-end processor services incoming packets appearing on two links. Specifically, front-end processors 210 consist of front-end processors $210_1, 210_2, 210_3, \ldots, 210_n$, which, are in turn, respectively connected to links $83_1$ and $87_1$, $83_2$ and $87_2$, $83_3$ and $87_3$, $\ldots, 83_n$ and $87_n$. The front-end processors are all identical. Each front-end processor contains a MicroVAX-II computer manufactured by Digital Equipment Corporation (which also owns the trademark "MicroVAX-II"). Each front-end processor executes layers 3 and below of the SS7 protocol including a message transfer part and a signaling connection control part.

Each FE processor is, in turn, connected through a well-known ETHERNET link (hereinafter referred to as a "dedicated" ETHERNET link) to a corresponding one of back-end processors 220 (ETHERNET is a registered trademark of Xerox Corporation). Alternatively, for added redundancy and performance, the SCP can be configured with each FE processor connected through a dedicated ETHERNET link to all of the BE processors. However, for purposes of simplicity, each FE processor will be shown and described as being connected to a single corresponding BE processor through its associated dedicated ETHERNET link. Each dedicated ETHERNET link is shown using a dot-dashed line in order to distinguish this ETHERNET connection from administrative ETHERNET network 212 and its inter-processor connections, which will be discussed below. Specifically, front-end processors $210_1, 210_2, 210_3, \ldots, 210_n$, are connected through dedicated ETHERNET links $216_1, 216_2, 216_3, \ldots, 216_n$, on a one-for-one basis to BE processors $220_1, 220_2, 220_3, \ldots, 220_n$, respectively. All the back-end processors are identical with each consisting of a VAX 8600 processor which is also manufactured by Digital Equipment Corporation (which also owns the trademark "VAX"). Each of the dedicated ETHERNET links is controlled by appropriate communications software executing in both the front- and back-end processors connected to either side of the link. This communications software forms part of the DECnet family of communications products available from Digital Equipment Corporation (which also owns the registered trademark "DECnet"). All application layers of SS7, collectively called the TCAP application layer, as discussed below, are executed within the back-end processors.

To process incoming queries for network services, all back-end processors 220 are able to access disk resident application databases containing customer records and context files. Specifically, back-end processors $220_1, 220_2, 220_3, \ldots, 220_n$ are connected through individual paired busses, specifically high speed dual path computer inter-connect busses $225_1, 225_2, 225_3, \ldots, 225_n$, through star coupler 230, to dual path computer interconnect busses $235_1$ and $235_2$. The computer inter-connect busses are controlled by appropriate communications software executing within the back-end processors and disk controllers and available within the DECnet family of communications products. These inter-connect busses, in turn, are connected to disk controllers 240 formed of disk controllers $240_1$ and $240_2$. Star coupler 230 is a well-known passive device that can be used to physically inter-connect up to sixteen high speed digital devices consisting of processors and disk controllers. Disk controllers $240_1$ and $240_2$ are each preferably model HSC50 available from Digital Equipment Corporation. Each of the controllers, specifically controllers $240_1$ and $240_2$, is connected through an appropriate bus, specifically bus $252_1$ or $252_2$, to one port of each disk drive $262_1, 262_2, \ldots, 262_m$, that forms paralleled disk drivers 262 (where "m" is an integer greater than zero). These disk drives collectively form a common shared disk farm and contain data files consisting of application databases containing the necessary customer records and, where necessary for conversation transaction processing, context files that are sufficient to support various network services that rely on remote processing provided by SCP 200. Each of the data files stored on the disks is arranged with multiple copies using a well-known "shadowing" technique to allow simultaneous access to multiple copies of the data and provide real time recovery in case of a failure of a disk drive, a disk itself or a disk controller. Multiple copies of the data files are also stored within each disk to improve access speed and provide increased system reliability.

All the front- and back-end processors are connected via separate ETHERNET local area network 212, which is referred to as an "administrative" ETHERNET local area network (LAN). This local area network permits communication to occur between the processors in order to provide synchronization and co-ordination therebetween. Specifically, administrative ETHERNET network 212 is connected to front- and back-end paired processors $210_1$ and $220_1$, $210_2$ and $220_2$, $210_3$ and $220_3$, $\ldots, 210_n$ and $220_n$, via respective leads $212_2, 212_2, 212_3, \ldots, 212_n$. This network uses the BX.25 protocol and is also controlled by appropriate communications software that forms part of the DECnet family of communications products. This network utilizes token passing. Specifically, a message is placed onto this network by a sending site, for example front-end processor $210_1$. This message is then picked up by an adjacent site on the network, e.g. front-end processor $210_2$. If the message is not for the latter front-end processor but instead is destined for a downstream site, then the adjacent site that received the message, here front-end processor $210_2$, will place the message back onto the network for reception at the next adjacent site, i.e. front-end processor $210_3$ and so on. The message repeatedly appears on the network as the message travels from site to site. Whenever the message finally reaches its destination site, the message will not be re-transmitted and hence is effectively "pulled" off the network. The processors that form the SCP are synchronized and co-ordinated through various so-called "one and only one" software processes that execute on only one of the back-end processors at any given time. These processes executing on one back-end processor, e.g. back-end processor $220_1$, communicate with all the other processes via administrative ETHERNET network 212. This communication generally involves application level commands to other back-end processors to gracefully bring up or remove a certain application, such as "800" call processing, calling card, PVN or the like, at other back-end processors or invoke a mate switch operation to another SCP. In addition, all the front-end processors can also communicate to each other via administrative ETHERNET network 212. These communications illustratively involve inquiries (changeover requests) regarding available links in the event of a link failure and accompanying acknowledgements (changeover acknowledgements), as well as other network management messages.

In addition, to provide a primary port through which craftspersons and/or technicians can locally manage the SCP, administrative ETHERNET network 212 is connected to maintenance and operations sub-system 270. This sub-system, typically a VAXstation II/GPX workstation produced by Digital Equipment Corporation (which also owns the trademark VAXstation II), is a multi-tasking workstation that is used to provide a system operator with simultaneous access to multiple processes executing within the SCP, such as status, configuration and re-configuration processes, performance data and alarm information. The information provided by sub-system 270 is displayed to a system operator. Similarly, the system operator can enter commands into SCP 200 through a well-known keyboard (not shown) that forms part of sub-system 270. Additionally, server 282 is connected to administrative ETHERNET network 212 to provide a simple interface for terminal 284 for communicating with any single task then executing within the SCP, e.g. run a single diagnostic within any processor or update a file and the like. Support system processor 272 is also connected to network 212 and is used to collect and disseminate, upon command, various SCP system statistics from each processor, such as utilization of each front- and back-end processor, number of failures of each such processor and/or of each application and the like. Processor 272 is also a MicroVAX-II processor provided by Digital Equipment Corporation.

In particular, for certain enhanced network services, such as those needed to implement a private virtual network (PVN), conversational transactions are required. Specifically, these services often require a caller to enter information, in addition to the called number, on an interactive basis before the SCP can fully process the call. A typical conversational transaction that would be expected to occur in PVN service is diagrammatically shown in FIG. 3.

Specifically, for PVN service, caller 100 would dial an associated telephone number, this action symbolized by dashed line 41, to gain access through local switch 12 or 14 (not shown for purposes of simplifying the drawing) to the PVN service. When the call reaches SSP 30, the SSP would then launch an SS7 packet, here designated by a circled letter "A", containing a query to SCP 200 to obtain appropriate routing information therefrom. After the receipt of this query, SCP 200 performs database access operation 91 into a customer record (not shown) to specify the next item of information, here a personal identification number and an authorization code that has to be obtained from the caller. Once this occurs, SCP 200 sends a conversational message within an SS7 packet, here designated by a circled letter "B", to SSP 30 to instruct the SSP to synthesize a pre-determined voice announcement through the local switch to caller 100 and then collect the resulting digits entered by the caller. To accomplish this, SCP 200 inserts an appropriate op code within a TCAP conversational message, and then transmits this message as a SS7 packet, designated by the circled letter "B", via CCS network 50 back to SSP 30. In response to this conversational message, SSP 30 generates an appropriate announcement, here symbolized by dashed line 43, to prompt caller 100 to enter the desired digits. Once caller 100 enters the necessary digits for his personal identification number and authorization code, as symbolized by dashed line 45, SCP 30 assembles an appropriate TCAP conversational message and transmits it as a SS7 packet, here designated by a circled letter "C", back to SCP 200. In response to this message, SCP 200 then performs database access operation 93 into the customer record in order to specify the next piece of information needed from caller 100. This request is sent as a conversational TCAP message within an SS7 packet, designated by a circled letter "D", back to SSP 30. Upon receiving this message, SSP 30 generates an appropriate announcement, symbolized by dashed line 47, through the local switch to prompt caller 100 to enter the information which, in turn, is transmitted back to SCP 200 as part of an appropriate TCAP conversational message within a SS7 packet. This iterative conversational process continues until the caller is prompted to enter the last piece of information specified by the customer record. Once the caller enters this last piece of information, here symbolized by dashed line 49, it is transmitted as a TCAP conversational message within an SS7 packet designated by a circled letter "p". Once this last conversational message has been received by SCP 200, the SCP will then perform database access operation 95 into the customer record through which the SCP will determine that it can now provide appropriate destination routing information for the call. At this point, SCP 200 will generate the routing information as symbolized by block 97 to provide the desired enhanced service to the caller. SCP 200 will then embed this destination routing information within a TCAP response message that will be transmitted as an SS7 packet, here depicted by a circled letter "Q", to SSP 30. Once the SSP receives this response message, it will then route the call accordingly. The number of separate conversational messages exchanged between SSP 30 (and caller 100) and SCP 200 will depend upon the specific required information defined by the customer record.

Through a technique that establishes a correspondence between each SS7 TCAP message in a conversational transaction and a specific entry in a context file, any BE processor that receives a conversational message which forms part of that transaction is able to access the particular entry, regardless of the specific BE processor with which the context file is associated. As such, any back-end processor that receives a conversational message is able to access the stored context information for that transaction and provide the necessary incremental processing therefor. This enables an SCP that employs a distributed architecture to provide conversational transaction processing. This technique which relies on, inter alia, use of certain protocol specific fields, namely originating and responding transaction identifiers, available within SS7 TCAP messages is fully described in my prior United States patent application "A METHOD FOR HANDLING CONVERSATIONAL TRANSACTIONS IN A DISTRIBUTED PROCESSING ENVIRONMENT", filed Aug. 8, 1988, assigned U.S. patent Ser. No. 229,241 and owned by the present assignee and which is incorporated by reference herein.

In particular, the originating and responding transaction identifier fields are each four octets in length. For a query, the value of the originating transaction identifier is initially generated by the SSP that generated the query. For a response message, the responding SCP merely echoes (reflects) the value of the originating transaction identifier it received, as part of the corresponding query, as the responding transaction identifier within the response message. Queries and responses only contain originating or responding transaction identifiers, respectively, but not both. However, conversational messages contain both originating and responding transaction identifiers. The first conversational message going from the SCP to the SSP contains both of these transaction identifiers. The value of the originating transaction identifier supplied by the SCP in this first conversational message is an application specific value generated by an application executing at that node (e.g. the SCP) while the responding transaction identifier in this message is the reflected value of the originating transaction identifier that was embedded in the query message. In generating the next conversational message, the SSP reflects the responding transaction identifier as the originating transaction identifier and vice versa. Each subsequent conversational message contains these identifiers in the reverse position from that in the immediately preceding conversational message so that the subsequent message can be associated with the proper transaction in the node that will be receiving this message. A detailed explanation of the formats and codes of SS7 TCAP messages is provided in Q.773 section of the Bellcore SS7 Specification.

The use of originating and responding transaction identifiers is diagrammatically shown in FIG. 3. Here, a TCAP query message generated by SSP 30 typically contains transaction ID field 121. The application, e.g. PVN, executing at the SSP which generated the query message places an application specific value, e.g. "X" which is associated with the current PVN transaction in the originating transaction identifier field within transaction ID field 121. There is no value in the responding transaction identifier inasmuch as SCP 200 has not yet started processing this transaction and hence has not conveyed any corresponding application information to SSP 30. Now, once SCP 200 begins processing this transaction, then the first conversational message generated by the SCP typically contains transaction ID field 124. Specifically, the PVN application executing within the SCP would reflect the originating transaction identifier value "X" as the responding transaction identifier value and insert the value "Z" as the originating transaction identifier value within transaction ID field 124. The "X" and "Z" values would be subsequently reflected, by SSP 30, as the originating and responding transaction identifiers in transaction ID field 127 that is embedded within the next conversational message, and so on for transaction ID fields 131 and 134 that are embedded within successive conversational messages occurring between the SCP and the SSP. Once the response is generated by SCP 200, then transaction processing within the SCP is complete. As such, the TCAP response message only contains a responding transaction identifier field having a value "X" within transaction ID field 137.

Now, to establish the necessary correspondence between each TCAP message and a specific entry in a context file located within an application database, a specific corresponding address is inserted as a corresponding originating and/or responding transaction identifier field by either an SSP or an SCP during transaction processing to specifically identify the location at which context information is stored for the transaction presently being processed at that node. The originating and responding transaction identifiers have the same structure, as explained in detail below. In particular, this address is generated by the appropriate call processor executing within the "starting" BE processor and specifies the relative location in a specific context file associated with this BE processor at which specific context information for this transaction is stored and can subsequently be found. Since this address is reflected back to the same node that initially generated this address, any BE processor located within this node, regardless of whether it is the starting BE processor or not, can through use of this address access the appropriate file to extract and/or update the necessary context information during any stage of transaction (call) processing. Inasmuch as any BE processor within the SCP is now able to access the proper context information for any transaction at any time during which it is being actively processed by that SCP, distribution of message packets among the active links connected to the SCP, as required by the SS7 protocol, will not adversely affect conversational transaction processing and advantageously permits an SCP that utilizes the replicated FE-BE architecture to provide enhanced network services that require conversational transaction processing.

FIG. 4 shows the constituent parts of a SS7 TCAP message as it pertains to the present invention. Generally, as shown, a TCAP message contains a transaction portion, such as transaction portion 405, followed by component portions 410, that contain one or more individual component portions $410_a$, $410_b$, ..., $410_j$. Each portion is formed of a series of fields, with each field generally varying in size from one to four octets.

The transaction portion of a TCAP message specifies various attributes regarding the entire TCAP message; while each component portion carries a specific application message. Specifically, within the transaction portion, the Package Type Identifier field specifies the type of the current TCAP message; namely, a query, a conversational message, a response or a unidirectional message. A query, a conversational or a response message does not exist by itself in isolation. Instead, these messages collectively occur during transactional (internode) processing carried on between two separate nodes on the CCS network. Specifically, a query message generated at an initiating node, e.g. an SSP, is associated with a transaction that at a recipient node, e.g. an SCP, will subsequently produce either a response or a conversational message. By contrast, a unidirectional message, when transmitted, is the only message required for a certain operation to be processed and as such only exists in isolation. Inasmuch as no ensuing conversational or response messages result from processing a unidirectional message, then once a unidirectional message is transmitted, the initiating node can immediately end the transaction that produced that message.

Now, with this in mind, the Total TCAP Message Length field specifies the length in octets of the entire TCAP message. The Transaction ID Identifier is a standard Valued code word, typically "C7" in hex, which specifies that transaction identifiers will follow. Through the use of transaction identifiers, a node on the CCS network that receives a TCAP message (queries, responses and conversational messages) can associate the current message with a specific transaction for a given application then being executed at that node. Inasmuch as a unidirectional message does not require inter-node transactional processing, unidirectional messages do not contain a Transaction ID. As such, the Transaction ID identifier and Transaction ID Length fields are both set to Zero. The Transaction ID Length field specifies the length, in octets (zero, four or eight), of the following transaction ID fields. The Transaction ID field, when it appears, may contain one or two four-octet transaction identifiers. For queries and responses, the transaction ID field contains only one transaction identifier which has been specifically defined by the application which generated the message. Alternatively, for conversational messages, the transaction ID field contains two separate transaction identifiers, i.e. an originating and a responding transaction identifier, in which each transaction identifier has been specifically defined by an associated application executing at each node on the network that is conducting a conversation. The values of the transaction identifiers are completely ignored by the SS7 protocol and merely passed by the SS7 protocol as part of an application message to the applications executing at the appropriate nodes.

To access a specific record stored within any context file, each transaction identifier, whether originating or responding, contains several specific fields that collectively contain a relative address to that specific record. Originating and responding transaction identifiers have the same bit structure. Specifically, as shown in FIG. 4, each transaction identifier, with the responding transaction identifier shown for purposes of illustration, is 32 bits wide with one bit, the most significant bit, (MATE bit <31>), designating whether the record is stored on SCP 200 (e.g. bit is set to a high value) or mate SCP 290 (i.e. bit is set to a low value), i.e. the transaction that utilizes this record originated on SCP 200 or its mate SCP. Inasmuch as an SCP does not have access to databases stored on its mate SCP, conversational messages that are destined for one SCP but received at its mate are simply ignored by the mate SCP, and vice versa. The next four significant bits, (BE_NUM bits <30:27>), specify a sequence number of the particular BE processor within the SCP that began processing the transaction (call), i.e. the starting BE processor. Since application software for any call processor executing on a BE processor within an SCP and associated databases can be updated under operating conditions through on-line storage of old and new versions and instantaneous changeover therebetween, the next significant bit, (FILE VERSION bit <26>), specifies whether the desired record is stored on a new or old version of the associated application databases. The following three significant bits, (CP_NUM bits <25:23>), provide the number of the specific call processor on this BE processor that is processing the call. Together the BE_NUM, FILE VERSION and CP_NUM fields point to a specific context file within the application databases residing within an SCP.

To locate a specific record within this file, the remaining 23 bits, ("tid" bits <22:0>), that are used in the transaction identifier contain a relative address, specifically an index value, that points to a specific record within this context file. The location for storing a record within a context file is determined by the value of circular index. As records are created, they are sequentially stored within a context file. As each record is stored, the value of a pointer (not shown) is appropriately incremented by one. Inasmuch as 23 bits are available as a relative address but far fewer records than could be separately addressed with a 23 bit address will typically be stored in a context file, the index is set to a value that equals the value of the pointer modulo the maximum number of records that will actually be stored in the file. Whenever the value of this pointer reaches a value that equals the maximum number of records to be stored in the context file, the value of the pointer is merely allowed to overflow which, in turn, causes the value of the index to point to the location of the first record in the file. Inasmuch as the size of the file is set to a value that is sufficiently large, as discussed above, to accommodate all call (transactional) processing that is expected to occur under worst case conditions within a given time period (such as five minutes), then, once the context file is full, the incrementing pointer allows the latest transaction record to merely over-write the oldest transaction record in the file.

Therefore, by incorporating such a transaction identifier into a conversational message coupled with use of relative addressed context files, any conversational message can be associated with its corresponding context information by any BE processor, thereby allowing conversational transactions to be readily processed in an SCP regardless of SS7 packet distribution.

Now, apart from the architectural aspects of an SCP as discussed above, the particular enhanced services that can be provided through an SCP using remote database translation are governed by the sophistication of a decision tree that can be embedded within individual customer records. This sophistication routinely increases as new services are developed and provisioned. As such, customer records constantly change as new service features are offered and are subscribed thereto or existing features that are no longer desired by individual subscriber(s) are deleted therefrom. Hence, the application databases that contain these records undergo continual revision. It is therefore incumbent upon local telephone companies to always utilize the most recent version of the application databases within the SCP and to frequently update these databases in order to provide the proper enhanced services to their subscribers.

To ensure that an SCP is able to provide adequate on-line call processing capacity to handle an unexpected peak in call volume for enhanced services, an SCP must remain on-line to provide transactional processing and not be removed from service while its application databases are being updated. As such, all application databases resident on an SCP must be updated on a real time basis.

Unfortunately, with the distributed processing environment provided by an SCP as discussed above, various transactions can be lost with a corresponding amount of call processing traffic being prematurely terminated as the result of updating application databases using techniques known in the art. This disadvantageously results in a number of calls for enhanced services being effectively dropped by the network and causes caller dissatisfaction.

In particular, one technique known in the art, hereinafter referred to as the "substitution" technique, for updating application databases in real time that reside in a distributed processing system relies on successively taking down each individual processor, creating a new version of each application database on the "down" processor, then directing that processor to immediately process transactions through the new application databases and thereafter returning that processor to service. Once this occurs, the old versions of these databases are merely deleted from storage. In effect, this technique simply substitutes, on a nearly instantaneous basis, a new version of each application database for a corresponding old version thereof. Unfortunately, this technique while being quite simple has a significant deficiency associated with its use: merely substituting one version of an application database for another in any back-end processor and thereafter immediately directing that processor to only use the new version thereof may cause the SCP to prematurely terminate transaction processing for a number of on-going conversational transactions and thereby lose traffic. In particular, as noted above, an SCP utilizes an architecture having loosely coupled replicated back-end processors that all access a common shared disk farm that stores the application databases for each of these processors. With this arrangement, different conversational messages that collectively form a given conversational transaction are typically routed to different back-end processors that each provides incremental processing for that transaction. In order to effectively implement conversational transaction processing with this architecture, each back-end processor that is to provide any such incremental processing utilizes a transaction identifier field embedded within each conversational message, as described above, to access a specific entry in a context file within the application database(s) associated with a particular back-end processor that initiated the entire processing of that transaction. Frequently, an updated application database, i.e. a new version of that database, is configured in a significantly different format than the old version thereof. Therefore, the newly updated application database that would be accessed by a back-end processor in the SCP may be incompatible with the old version of the same database that would otherwise, in the absence of being updated, be accessed by that processor. Consequently, if a conversational transaction is being processed within an SCP using the old version of the application database and then an update occurs causing the remainder of the processing of that transaction to be performed using the newly updated version of that database, then, due to incompatibility between the versions, the SCP will likely be unable to process the next or a subsequent conversational message in that transaction and will accordingly drop the entire transaction thereby disadvantageously terminating the call.

Premature termination of transaction processing that results from updating an application database using the "substitution" technique is depicted in FIGS. 5A and 5B, and 6A and 6B which together show illustrative message flow for processing in an SCP, e.g. SCP 200, a single illustrative conversational transaction, such as that shown in FIG. 3 during an interval which spans a "substitution" update, i.e. from a time extending shortly before this update occurred to a time shortly after this update occurred. With this in mind, the discussion will first proceed to generally describe the transaction processing that occurs in the SCP shown in FIGS. 5A and 5B, then discuss the specific conversational transaction processing that occurs within this SCP for the illustrative transaction but prior to the occurrence of a "substitution" update and thereafter address the conversational transaction processing shown in FIGS. 6A and 6B that subsequently occurs for this illustrative transaction shortly after the update has occurred. The correct alignment of the drawing sheets for FIGS. 5A and 5B, and 6A and 6B is respectively shown in FIGS. 5 and 6.

As noted above and as shown in FIGS. 5A and 5B, incoming packets from STP 56 to SCP 200 are distributed by the SS7 protocol among individual physical links $83_1, 83_2, \ldots, 83_n$ that are then active within link set 83 to corresponding FE-BE processor pairs. Each FE processor, e.g. FE processor $210_1$, through an SS7 Protocol processing operation, e.g. operation $213_1$ executing in FE processor $220_1$, processes layers 1, 2 and 3 of both an incoming SS7 packet to yield an associated TCAP message for subsequent processing by a corresponding BE processor, e.g. BE processor $220_1$, and an outgoing TCAP message supplied by this BE processor to yield an associated outgoing SS7 packet.

Each BE processor executes a set of service specific TCAP Processes, e.g. TCAP Processes $226_1$ in corresponding BE processor $220_1$, that parses a message, e.g. a query or conversational message, from an incoming TCAP message and then routes the parsed message to a specific one of several independent call processors, i.e. call processors $221_1, 221_2, \ldots, 221_m$ that execute in that BE processor. Each of these TCAP Processes also receives a response message from a corresponding call processor and then constructs an appropriate TCAP message that contains the response. Each call processor CP) contains one or more specialized software routines and supports a different enhanced network service, e.g. one call processor, e.g. $CP_2$, exists for PVN service, another, $CP_1$, for a different enhanced service and so on. For increased redundancy and performance, multiple identical call processors can be executing on the same BE processor to provide the same service. However, to simplify the drawing and the ensuing discussion, only one call processor will execute on each BE processor to provide each different enhanced service. Typically, each call processor executing on a BE processor, e.g. call processors $221_1, \ldots, 221_m$ for BE processor $220_1$, utilizes different corresponding application databases located within the application databases for that BE processor. Each application database for each enhanced service, such as PVN, and associated with each BE processor typically includes a file, e.g. file 5610, of stored context information for each on-going conversational transaction and a file, e.g. file 5613, of customer records. To simplify FIGS. 5A and 5B, only those files that support PVN service and reside within application databases $561_1$ are specifically shown in these figures. Through the use of identical transaction database access routines, e.g. routines $227_1$, executing within each BE processor, e.g. BE processor $220_1$, each call processor executing within that BE processor is able to access any application database over an associated software access path. Specifically, application databases $561_1$, $561_2$, $661_3$, ..., $561_n$ that collectively form databases 560 can each be accessed by any call processor executing within BE processors $220_1$, $220_2$, $220_3$, ..., $220_n$ through respective software access paths $541_1$, $541_2$, $541_3$, ..., $541_n$ that collectively form access paths 541; access paths $543_1$, $543_2$, $543_3$, ..., $543_n$ that collectively form access paths 543; access paths $545_1$, $545_2$, $545_3$, ..., $545_n$ that collectively form access paths 545; and access paths $547_1$, $547_2$, $547_3$, ..., $547_n$ collectively form access paths 547. Although communication between each BE processor and corresponding application databases would occur, as shown in FIGS. 2A and 2B, through dual path computer interconnect busses, star coupler 230, a disk controller and either bus $252_1$ or bus $252_2$ and would be controlled by appropriate disk access and control software, this communication is simply represented in FIGS. 5A and 5B by a corresponding access path running between each BE processor and corresponding application databases.

Now, for illustrative purposes, assume that an SS7 PVN query packet, denoted by the circled letter "A", for initiating a conversational transaction has just been routed by the SS7 protocol over link set 83, and specifically link $83_1$, to FE processor $210_1$ just prior to the occurrence of a "substitution" update operation. As represented by line 501, this packet is routed over link $83_1$ to FE processor $210_1$ located within SCP 200. This FE processor through SS7 protocol processing operation $213_1$ processes layers 1, 2 and 3 of this SS7 packet and parses the TCAP PVN query message, represented by "(A)", from the packet and sends, as symbolized by line 503, this TCAP message to BE processor $220_1$.

Thereafter, TCAP Processes $226_1$ executing within BE processor $220_1$ parses the PVN query itself from the TCAP message and then routes the query using its internal address to an input queue (not shown) within the PVN call processor executing within this BE processor, e.g. call processor $221_2$. For the incoming PVN query, call processor $221_2$ accesses the appropriate customer record stored within customer record file 5613 situated within application databases $561_1$, as symbolized by line 509, to determine whether any additional information must be obtained from the caller in order to process the transaction. If this access specifies that additional information, here digits for a PIN and an authorization code, is needed, an op-code that specifies the next piece of information, digits for the PIN and authorization code, that needs to be obtained from the caller is sent back to the call processor, as symbolized by line 511. Thereafter, call processor $221_2$ invokes an appropriate routine within transaction database access routines $227_1$ to determine the address of the next record in PVN context file 5610 situated within application databases $561_1$ and then add a new record to this context file to store the context of all PVN call processing associated with this query. Call processor $221_2$ then formulates a conversational message. This message contains the op code in order to instruct SSP 30 to obtain the necessary information. In addition, this message also contains a specific value for the originating transaction identifier. This value (illustratively value "Z" as the originating transaction identifier shown in FIG. 3) identifies context file 5610 residing within application databases $561_1$, shown in FIGS. 5A and 5B, and also provides the relative address of the particular record within that file at which the context information for this transaction is being stored. The value of the originating transaction identifier that existed within the TCAP query message (value "X" as shown in FIG. 3) initially generated by SSP 30 is copied by routines $227_1$, shown in FIGS. 5A and 5B, into the responding transaction identifier. Consequently, a resulting conversational message containing this op code and these originating and responding transaction identifiers are routed by call processor $221_2$ through an appropriate output queue (not shown) to TCAP Processes $220_1$ to fabricate an appropriate TCAP conversational message. Thereafter, this TCAP conversational message, represented by "(B)", is routed, as symbolized by line 517, over line $216_1$ to FE processor $210_1$. Here, SS7 protocol processing operation $213_1$ fabricates a SS7 packet that contains this TCAP conversational message, and then transmits this packet represented by the circled letter "B", over active link $83_1$, as symbolized by line 519, to STP 56 for eventual routing through CCS network 50 to SSP 30. Since all the call processors executing in the SCP utilize input and output queues for temporary message buffering, then to simplify the discussion, these queues will not be discussed any further.

Now, after SCP 200 has generated a conversational message back to STP 56, assume that all the application databases that contain customer records, and specifically the application databases associated with BE processor $220_1$, are updated using the "substitution" technique. As a result and as shown in FIGS. 5A, 5B, 6A and 6B, the older versions of application databases $561_1$, $561_2$, $561_3$, ..., $561_n$ that contain customer records are merely replaced on a nearly instantaneous basis with corresponding new versions thereof, specifically application databases $562_1$, $562_2$, $562_3$, ..., $562_n$. Accordingly, application databases $562_1$ shown in FIGS. 6A and 6B contain customer record file 5623 which is an updated version of customer record file 5613 that resides within application databases $561_1$ and newly created context file 5620 in lieu of context file 5610 shown in FIGS. 5A and 5B. To simplify FIGS. 6A and 6B, only those files that support PVN service and reside within application databases $562_1$ are specifically shown in these figures. For a worst case scenario, also assume that the new version of each of these application databases that contains customer records and context files is in a different format from the old version thereof such that the new version of each database, specifically either the customer record file or the context file, is not downwardly compatible with its old version.

Figure 5B:
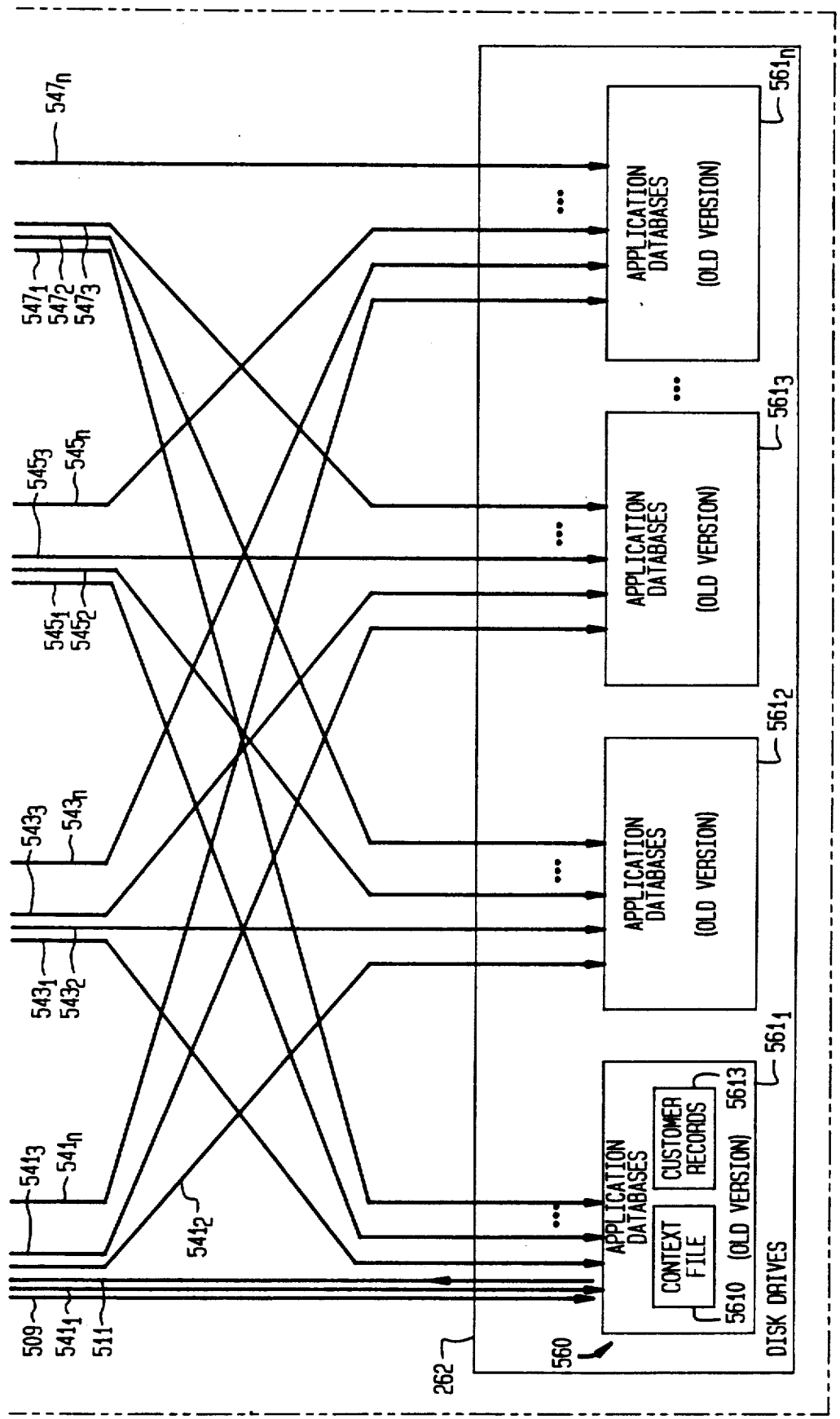
Figure 6B:
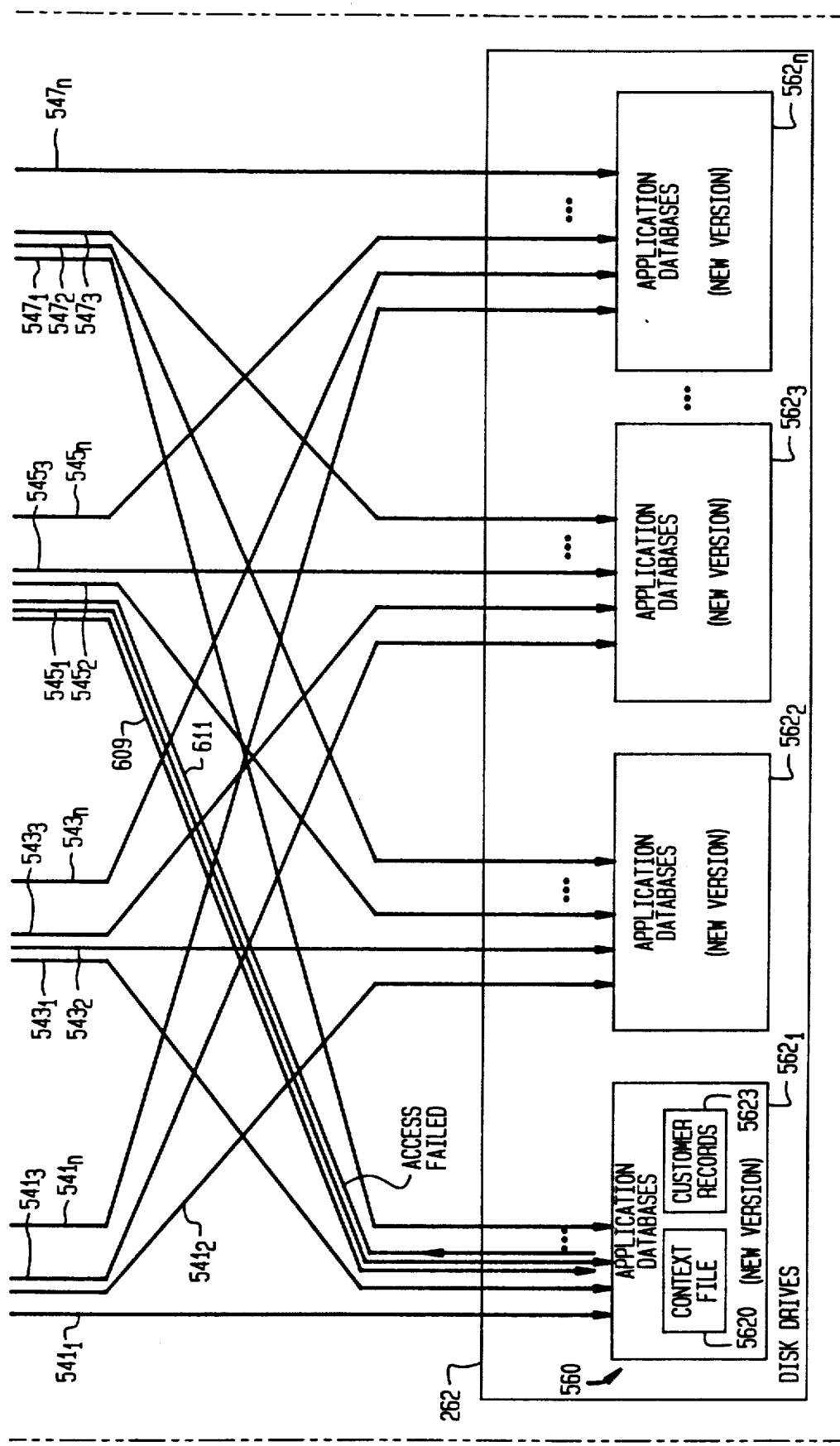

After the "substitution" update has occurred the message flow that will be associated with subsequent processing of the illustrative conversational transaction initially shown in FIGS. 5A and 5B is depicted in FIGS. 6A and 6B.

As the next portion of this transaction, SSP 30 will issue a packet containing a conversational message, represented by the circled letter "C", that includes digits for the PIN and authorization code that were entered by the caller. This packet, as a result of SS7 packet distribution, may be routed to a different active link than link $83_1$ in link set 83 shown in FIGS. 6A and 6B. Assume, for purposes of the present discussion, that the active link that is used is illustratively link $83_3$. As such, the incoming SS7 packet is routed over link $83_3$, as symbolized by line 601, to FE processor $210_3$. This FE processor, similar to FE processor $210_1$ that has been discussed above, processes layers 1, 2 and 3 of this incoming SS7 packet, using SS7 protocol Processing Operation $213_3$, and sends the TCAP conversational message, represented by "(C)", contained in this packet to BE processor $220_3$, as symbolized by line 603. TCAP Processes $263_3$ executing Within BE processor $220_3$ parse the conversational message from the TCAP message and then route the conversational message using its internal address to the PVN call processor executing Within this BE processor, e.g. call processor $223_2$. This call processor examines the responding transaction identifier field contained within the TCAP message. Inasmuch as this field contains an address "Z" which points to a specific record within a context file stored within application databases $562_1$, this call processor will attempt to access this record using both transaction database access routines $227_3$ and access path $545_1$ in order to obtain the current contextual information regarding the current state of transaction processing for this call for PVN service and to access the customer record in order to determine how the incoming digits for the PIN and authorization code are to be processed. These access operations are symbolized by line 609.

Unfortunately, the customer records stored Within file 5623 contained in application databases $562_1$ are not downwardly compatible with those that previously existed within customer record file 5613 that resided in application databases $561_1$ (see FIGS. 5A and 5B). As such, when call processor $223_2$, as shown in FIGS. 6A and 6B, attempts to access the desired customer record Within application databases $562_1$, this access operation Will likely fail. Accordingly, the application database manager (not shown) will return, as symbolized by line 611, an "access failure" type error message to call processor $223_2$. Inasmuch as call processor $223_2$ is unable to obtain the necessary information from application databases $562_1$ that this processor requires to continue processing this transaction, call processor $223_2$ will simply terminate call processing for this transaction, as depicted by line 615 and operation block 619. Accordingly, the call for PVN service that is associated with this conversational transaction Will be dropped by the network.

Disadvantageously, the SCP, due to the downward incompatibility between successive versions of the application databases, will likely prematurely terminate transaction processing for those calls for which transaction processing was initiated but not concluded prior to the occurrence of a "substitution" update operation. This results in lost traffic and lost revenue to a telephone operating company during each such update interval.

III. Real Time Updating in a Replicated FE-BE Processing Environment

The deficiency, i.e. premature transaction termination, associated With updating application databases residing in a distributed processing system in real time using techniques known in the art is advantageously overcome through use of my present invention.

Through my invention, as described in detail below, each BE processor uses both the old and new versions of the application databases in processing conversational transactions that occur during an update interval with a file version bit located within each SS7 conversational message used to select the appropriate version of the databases and a service dependent "transfer" period used to delineate the point in time When the old versions of these databases can be deleted from storage.

In particular, When an update operation is to commence, application processing is taken "down" on each BE processor in the SCP in succession. This is accomplished by instructing the associated FE processor, e.g. FE processor $210_1$, through for example maintenance and operations sub-system 270 and administrative ETHERNET local area network 212 (see FIGS. 2A and 2B), to "busy" the associated SS7 links, e.g. links $83_1$ and $87_1$, leading to this FE processor thereby removing traffic from its corresponding BE processor, e g. BE processor $220_1$. Only one BE processor is taken down at a time to assure that the SCP, being configured With an "n+1" processor architecture, always provides a desired minimum capacity of "n" active front- and back-end processor pairs to process calls that occur during an update interval.

While application processing is "down" on a BE processor, new program software and new versions of various application databases, i.e. those containing the customer records, are typically loaded onto disk drives 262 for that BE processor. Upon completion, that BE processor is then instructed to initiate application processing though it is not yet returned to active call processing, i.e. its associated SS7 links still remain in a "busy" state. At this point, this BE processor creates a new version of each of its remaining application databases, i.e. its context files, and then performs a suitable initialization operation. Rather than merely substituting a new version of each application database, e.g. those containing customer records, for an old version thereof, both of these versions are allowed to co-exist on disk drives 262 and are accessible by any BE processor. Once this BE processor has suitably initialized itself, it is then returned to active call processing through a suitable instruction being given, through for example maintenance and operations sub-system 270 and administrative ETHERNET local area network 212, to its associated FE processor to activate the two SS7 links running thereto. Though this BE processor is now operating on a new version of its application program, this processor is instructed to only utilize the old version of its application databases for any transactional call processing which it initiates at this time. As such, after the last BE processor has been returned to active call processing, all the BE processors will be initiating conversational transaction processing for new transactions, i.e. for incoming calls, using the old versions of all their application databases. Specifically, the file version bit within the originating transaction identifier portion of any SS7 conversational message transmitted by the SCP back to an SSP will be set by the particular BE processor that generated this message to a value, e.g. "0", that signifies use of the old version of the application databases.

Once all the BE processors are processing conversational transactions in a "stable" manner using the old versions of the application databases, a "retrofit commit" command is entered by an operator through maintenance and operations sub-system 270 and then disseminated via administrative ETHERNET local area network 212 to each individual BE processor. At this point, all the BE processors that are processing ongoing transactions, i.e. those transactions that contain a "o" value in the file version bit within a received responding transaction identifier from an SSP, will continue to access the old versions of the application databases in processing these transactions. As such, these transactions will be fully processed to completion using only the old versions of the application databases. However, any new transaction for an incoming call that occurred after the occurrence of the "retrofit commit" command will be processed by any BE processor using only the new version of its application databases. In this instance, the BE processor that provides the initial transaction processing, as well as every subsequent BE processor that provides incremental transaction processing thereof, sets the file version bit within the originating transaction identifier portion of any SS7 conversational message in this transaction and transmitted by the SCP back to an SSP to an opposite value, e.g. "1", in order to signify that the new version of the application databases is to be used to process this transaction.

Accordingly, all transactions initiated prior to the occurrence of the "retrofit commit" command will be fully processed using the old versions of the application databases; while, all subsequently initiated transactions will be fully proceeded using the new versions of the application databases. Since no transaction is forced to utilize two different versions, i.e. old and new, of the same application databases, as would occur With the "substitution" technique known in the art, substantially no transactions, if any, are prematurely terminated during an update operation. Consequently and advantageously, substantially no call traffic is lost during an update interval Moreover, as more and more new transactions are initiated after the "retrofit commit" command occurred the new versions of the application databases will see increasing use While use of the old versions will eventually decrease to zero as all the old transactions are completely processed and/or expire. The period of time, henceforth referred to as the "minimum transfer interval" or "conversation" interval, that spans the point in time at which transactions will begin using the new versions of the application databases to the point in time when transactions completely cease using the old versions of these databases will depend upon the pendency of each of the transactions and the rate at which transactions are initiated. This interval varies in general from one transactional processing application to another and within enhanced telephone call processing from one particular service to the next. In order to free the storage space occupied by the old versions of the application databases from disk drives 262, a pre-defined interval of time, henceforth referred to as the "transfer period", which equals the minimum transfer interval and an applicable safety margin is established during which both the old and new versions of the same application databases are kept on-line. For PVN service, the transfer period is set to approximately five minutes. As such, once the transfer period has expired since the issuance of a "retrofit commit" command, no transactions will be expected to be using the old version of the application databases. Accordingly, the old versions can then be deleted from storage. Alternatively, if depending upon the application, a safety margin is not needed, then the transfer period can be set to equal to the period of time equal to the longest expected conversation interval.

With this description in mind, FIG. 7 shows the versions of the application databases that are on-line and used during various stages during an update operation performed in accordance with the teachings of my invention as used in an SCP that illustratively contains four back-end processors, e.g. BE processors $220_1$, $220_2$, $220_3$ and $220_4$. As shown, prior to the commencement of the update, only the old version of the applications databases, i.e. application databases $561_1$, $561_2$, $561_3$ and $561_4$, respectively exist for each BE processor. Thereafter, as shown, each BE processor is successively re-stated with a new version of its application software; as such, new versions of certain application databases will merely be loaded as in the case of customer records, while a new version of other application databases as in the case of context files will be created by that BE processor. Specifically, after BE processor $220_1$ is re-started, its databases contain new application database versions $562_1$ and old application database version $561_1$. All the other applications databases merely contain the old versions thereof, i.e. databases $561_2$, $561_3$ and $561_4$. Similarly, as each BE processor, e.g. BE processors $220_2$, $220_3$ and $220_4$, is returned to active call processing, its application databases successively include new application database versions $562_2$, $562_3$ and $562_4$, respectively. Therefore, once all the BE processors have been re-started and returned to active service, both the old and new versions of all the application databases, i.e. database $561_1$, $561_2$, $561_3$, and $561_4$ and $562_1$, $562_2$, $562_3$ and $562_4$, are all on-line and accessible by any of these BE processors; however, all of these processors will be using the old versions of the application databases to process conversational transactions. Once the "retrofit commit" command has been issued the transfer period begins during which both the old and new versions of the applications databases remain on-line and are both used by each BE processor to process conversational transactions. Once the transfer period has expired, all conversational transactions that were initiated prior to the occurrence of the "retrofit commit" command will have been completely processed, and no further transactions will be processed using the old versions of the applications databases. Consequently at the expiration of this period, the old versions of these databases are deleted from disk storage leaving only the new versions thereof, i.e. application databases $562_1$, $562_2$, $562_3$ and $562_4$.

Figure 8B:
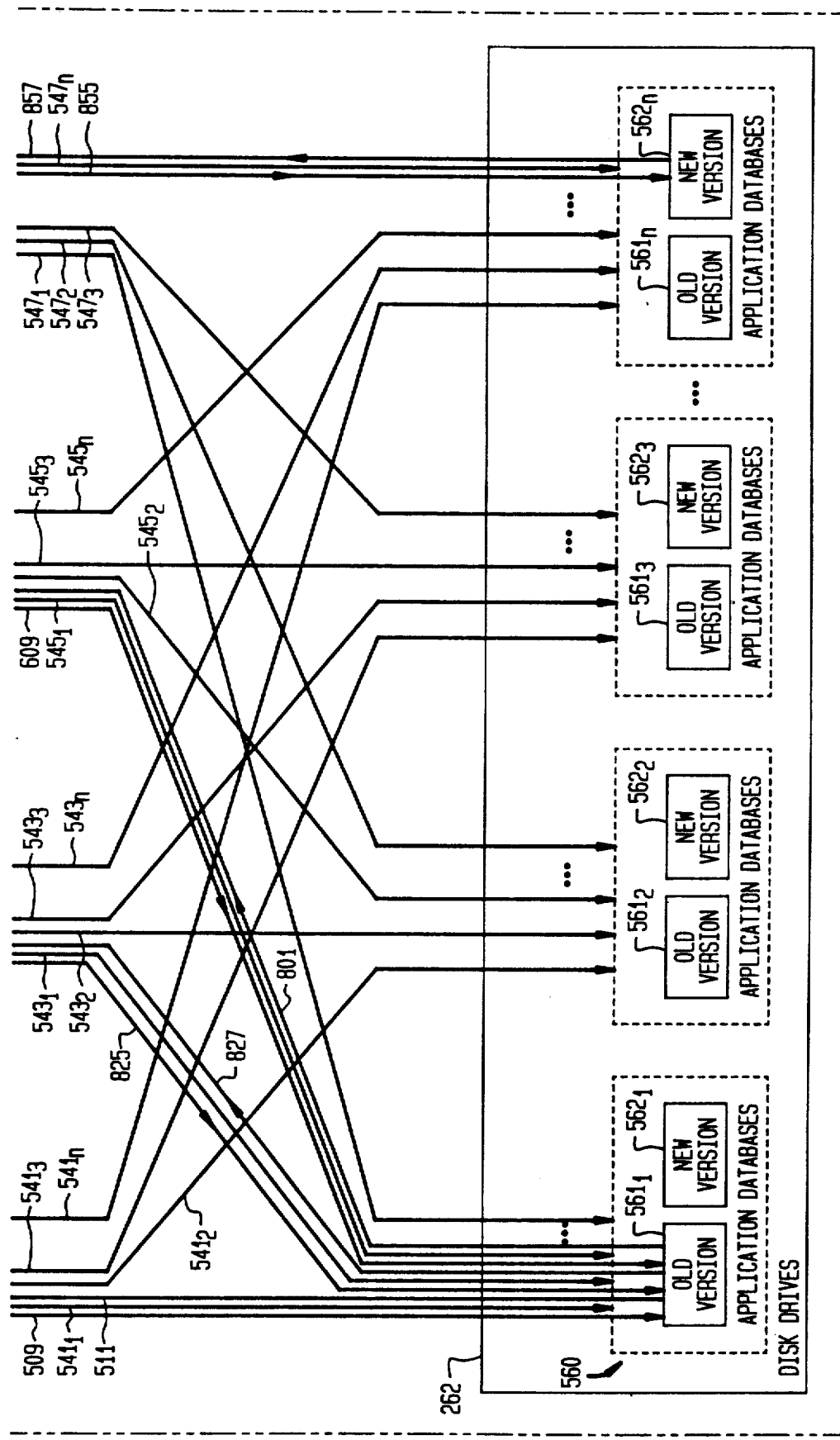

FIGS. 8A and 8B, for which the correct alignment of the drawing sheets for these figures is shown in FIG. 8, collectively and diagrammatically depict illustrative message flow that could occur within SCP 200, shown in FIGS. 2A and 2B, for processing an illustrative conversational transaction similar to that shown in FIGS. 5A and 5B and which extends into the transfer period as well as the message flow that occurs for processing a portion of a new transaction that started during this period, all while this SCP is being updated in accordance with my invention.

To clearly understand FIGS. 8A and 8B, assume that prior to the start of a transfer period, an SS7 PVN query packet, denoted by the circled letter "A", for initiating conversational processing is routed by the SS7 protocol over link set 83, and specifically link $83_1$, to FE processor $210_1$. As represented by line 501 in FIGS. 8A and 8B, this SS7 packet is routed over link $83_1$ to FE processor $210_1$ located within SCP 200. This FE processor processes layers 1, 2 and 3 of this SS7 packet and parses the TCAP PVN query message, represented by "(A)", from the packet and sends, as symbolized by line 503, this TCAP message to BE processor $220_1$. As described above, TCAP Processes $226_1$ executing within BE processor $220_1$ then parse the PVN query from the TCAP PVN query message and then route the query using its internal address to PVN call processor $221_2$ executing within this BE processor. Assuming that a "retrofit commit" command has not yet occurred, then for this PVN query, call processor $221_2$ accesses, using transaction database access routines $227_1$, the appropriate customer record stored within customer record file 5613 (specifically shown in FIGS. 5A and 5B) residing within old application databases $561_1$, as symbolized by line 509 shown in FIGS. 8A and 8B, to determine whether any additional information must be obtained from the caller in order to process the transaction. If this access specifies that additional information is needed, then an op-code that specifies the next piece of information, here digits for a PIN and an authorization code, that need to be obtained from the caller is sent back to the call processor, as symbolized by line 511. Thereafter, this call processor invokes an appropriate routine within transaction database access routines $227_1$ to determine the address of the next record in PVN context file 5610 (specifically shown in FIGS. 5A and 5B) situated within application databases $561_1$ and then add a new record to this context file to store the context of all PVN call processing associated with this query. Call processor $221_2$, as shown in FIGS. 8A and 8B, then formulates a conversational message. This message contains the op code needed to instruct SSP 30 to obtain the necessary information from the caller. Thereafter, TCAP Processes $226_1$ forms a TCAP conversational message, represented by "(B)", that contains a specific value stored in both the CP_NUM (bits <25:23>) and tid (bits <22:0>) bits, as shown in FIG. 4, for the originating transaction identifier. This value (illustratively value "Z" as the originating transaction identifier shown in FIG. 3) identifies the specific call processor and the context file within application databases $561_1$ and thereby provides the relative address of the particular record residing within that file at which the context information for this transaction is being stored. The value of the originating transaction identifier that existed within the TCAP query message (value "X" as shown in FIG. 3) initially generated by SSP 30 is copied by routines $227_1$ into the responding transaction identifier that forms part of this message. In addition, since the old version of the application databases, i.e. databases $561_1$, is being used to process this transaction, TCAP Processes $226_1$ executing with BE Processor $220_1$ also sets the value of the file version (FV) bit (bit <26>) (see FIG. 4) situated within the originating transaction identifier field "Z" in TCAP conversational message (B) to "0" to specify that the old version of the application databases, i.e. databases $561_1$, is to be used to process this entire transaction. Thereafter, TCAP conversational message B) is routed, as symbolized by line 517 shown in FIGS. 8A and 8B, over link $216_1$ to FE processor $210_1$ which, in turn, fabricates a SS7 packet that contains this TCAP conversational message, and then transmits this packet represented by the circled letter "B", over active link $83_1$, as symbolized by line 519, to STP 56 for eventual routing through CCS network 50 to SSP 30 (see FIG. 3).

Now, after SCP 200 has generated a conversational message back to STP 56, assume that the "retrofit commit command" has been issued to all BE processors thereby starting the transfer period during which these back-end processors utilize both the old and new versions of the application databases to respectively process transactions that were initiated before and during the transfer period.

As such, shortly after the transfer period has started, SSP 30 issues a packet, represented by the circled letter "C" shown in FIGS. 8A and 8B, that contains the digits for the PIN and authorization code that were just entered by the caller. This packet, as a result of SS7 packet distribution, will likely be routed to a different active link than link $83_1$ in link set 83 shown in FIGS. 8A and 8B. Assume, for purposes of the present discussion, that the active link that is used is illustratively link $83_3$. As such, the incoming SS7 packet is routed over this link as symbolized by line 601, to FE processor $210_3$. This FE processor, similar to FE processor $210_1$ that has been discussed above, processes layers 1, 2 and 3 of this incoming SS7 packet and sends the TCAP conversational message, represented by "(C)", contained in this packet to BE processor $220_3$, as symbolized by line 603. TCAP Processes $226_3$ executing within BE processor $220_3$ parse conversational message (C) from the TCAP message and then route the conversational message using its internal address to the PVN call processor executing within this BE processor, e.g. call processor $223_2$. This call processor examines the responding transaction identifier field contained within this TCAP message. This field, as noted above, was merely echoed by SSP 30 (see FIG. 3) and contains an address "Z" that specifies a relative address to the record containing the context of this transaction and also, through a zero stored within the file version bit of this transaction identifier, specifies that this record resides on old application databases $561_1$. Accordingly, call processor $223_2$ as shown in FIGS. 8A and 8B, using transaction database access routines $227_3$, accesses the record residing within old application databases $561_1$ in order to obtain the current contextual information regarding the current state of transaction processing for this call for PVN service. This access operation is symbolized by line 609. Once this context information is provided to call processor $223_2$, this call processor using routines $227_3$ accesses the appropriate customer record residing within application databases $561_1$ with the entered digits for the PIN and authorization code and then appropriately updates the context information for this transaction, also symbolized by line 609. As a result of this access, the customer record may specify an additional piece of information that needs to be obtained from the caller. An op code representing this information is supplied, as symbolized by line 801, by the customer record back, via access routines $227_3$, to call processor $223_2$. The call processor assembles a conversational message that contains this op code. In addition, this message contains the value "Z" as the originating transaction identifier, to specifically point to the record stored within old application databases $561_1$ at which contextual information for the current transaction being processed is stored, and the value "X" as the responding transaction identifier in order to enable SSP 30 to associate this conversational message with a specific transaction it is processing. Thereafter, call processor $223_2$ routes this conversational message to TCAP Processes $226_3$ to fabricate an appropriate TCAP conversational message, here represented by "(D)". Thereafter, this TCAP conversational message is routed, as symbolized by line 803, over link $216_3$ to FE processor $210_3$. This FE processor, through SS7 protocol processing occurring therein, fabricates a SS7 packet that contains this TCAP conversational message, and then transmits this packet represented by the circled letter "D", over active link $83_3$, as symbolized by line 811, to STP 56 for eventual routing through CCS network 50 to SSP 30. Alternatively, rather than update the context information in application databases $561_1$, call processor $223_2$ could create a new conversational transaction for this call and establish a new record containing appropriate context information in application databases $561_3$.

For each subsequent TCAP conversational message that forms part of this illustrative transaction and has been generated by SSP 30 and routed as a packet through STP 56 to any FE processor within SCP 200, the corresponding BE processor utilizes the value of the responding transaction identifier "Z", including the file version bit therein (that has been set to zero at the inception of the transaction by BE processor $220_1$), to access a context record stored within old application databases $561_1$ so as to obtain the current state of transaction processing for this call and also to access the customer record residing within the old application databases in order to determine the proper incremental transaction processing that should now be undertaken for this call given the additional information just supplied by SSP 30. Once this occurs, the corresponding BE processor updates the context information stored in old application databases $561_1$ to reflect the additional piece of information supplied by SSP 30 and hence a subsequent change in the state of transaction processing for this call.

Eventually, SSP 30 will generate a packet, represented by the circled letter "P", that Will contain the last TCAP conversational message in the current transaction. As a result of packet distribution inherent in the SS7 protocol, STP 56 may route this packet over active link $83_2$ located within link set 83 to SCP 200. As such, this packet will be routed, as symbolized by line 821, to FE processor $210_2$. This FE processor, similar to FE processors $210_1$ and $210_3$ that have been discussed above, processes layers 1, 2 and 3 of this SS7 packet and sends the TCAP conversational message, represented by "(P)", contained in this packet to BE processor $220_2$, as symbolized by line 823. Thereafter, TCAP Processes $226_2$ executing within BE processor $220_2$ parse the conversational message from the TCAP message and then route the conversational message using its internal address to the PVN call processor executing within this BE processor, e.g. call processor $222_2$. This call processor examines the responding transaction identifier field contained within the TCAP message. This identifier which, as noted above, was merely echoed by SSP 30 (see FIG. 3) contains an address "Z" that specifies a relative address to the record containing the context of this transaction and also, through a zero stored within the file version bit of this transaction identifier, specifies that this record resides on old application databases $561_1$. Accordingly, call processor $222_2$ shown in FIGS. 8A and 8B, using transaction database access routines $227_2$, accesses the context record residing within old application databases $561_1$ in order to obtain the current contextual information regarding the current state of transaction processing for this call for PVN service. This access operation is symbolized by lines 825. Once this context information is provided to call processor $222_2$, this call processor, through use of access routines $227_2$, accesses the appropriate customer record residing within old application databases $561_1$ with the latest item of information, represented by "(P)", that has been provided by the caller through SSP 30. Inasmuch as all the necessary information has been entered as specified by the customer record, the customer record now provides, via access routines $227_2$, a response containing appropriate call routing information (a destination routing number and carrier identification) to the query. At this point all that remains to conclude transactional processing is to form a SS7 packet containing this response and transmit it back to SSP 30. The specific context record for this transaction residing within old application databases $561_1$ can be updated, if desired, by BE processor $227_2$ to indicate that this transaction has been concluded. Alternatively, since each context file uses a circular file structure, as discussed above, the record for this transaction need not be updated. In this case, this record will subsequently be ignored until it expires at which point it will simply be over-written by context information for a subsequently occurring transaction. In any event, to furnish a SS7 response packet to SSP 30, the resulting call routing information furnished by old application databases $561_1$, as represented by line 827, is assembled into a response message by call processor $222_2$. Thereafter, this response message is fabricated into an appropriate TCAP response message, represented by "(Q)", by TCAP processes $226_2$. Thereafter, this TCAP response message is routed, as symbolized by line 831, over link $216_2$ to FE processor $210_2$. This FE processor, through SS7 protocol processing occurring therein, fabricates a SS7 packet that contains this TCAP response message, and then transmits this packet, represented by the circled letter "Q", over active link $83_2$, as symbolized by line 833, to STP 56 for eventual routing through CCS network 50 to SSP 30. Since transmission of this SS7 packet by SCP 200 concludes the processing of this transaction, the TCAP response message generated by BE processor $220_2$ only contains the value "X" as the responding transaction identifier in order to enable SSP 30 to associate this packet with a specific transaction it is processing. As discussed above, the TCAP response message contained in this packet has no originating transaction identifier.

As one can now readily appreciate, since this illustrative transaction started prior to the transfer period, i.e. prior to the occurrence of a "retrofit commit" command, all conversational transaction processing for this transaction occurs through only the old versions of the application databases. Transaction processing is not bifurcated between the old and new versions of the application databases as would otherwise disadvantageously occur through use of the "substitution" technique known in the art. As such, through use of my invention, processing of this transaction will advantageously not be adversely affected by the occurrence of an update to any of the application databases. Consequently, substantially no transactions, if any, will be lost as the result of updating an application database, and no call traffic occurring during an update interval will be dropped by the network.

To illustrate the manner in which transactions that start during the transfer period are processed, the message flow for a portion of one such illustrative transaction is shown in FIGS. 8A and 8B. Assume, with respect to these figures and for purposes of illustration, that after the "retrofit commit" command was issued and the transfer period started, a SS7 query for PVN service, here represented by the circled letter "U", appears over link $83_n$ in link set 83 and is thereby routed, as represented by line 851, to FE processor $210_n$. This FE processor processes layers 1, 2 and 3 of this SS7 packet and parses the TCAP PVN query message, represented by "(U)", from the packet and sends, as symbolized by line 853, this TCAP message to BE processor $220_n$. As described above, TCAP Processes $226_n$ executing within this BE processor then parse the PVN query from the TCAP PVN query message and then route the query using its internal address to PVN call processor $224_2$ executing within this BE processor. Inasmuch as a "retrofit commit" command has just occurred but the transfer period has not yet expired, then for this PVN query, call processor $224_2$ accesses, using transaction database access routines $227_n$, the appropriate customer record stored within new application databases $562_n$, as symbolized by line 855, to determine an item of additional information that must be obtained from the caller in order to process the transaction. As a result, an op-code, which specifies that digits for a PIN and an authorization code need to be obtained from the caller, is sent back to the call processor, as symbolized by line 857. Thereafter, call processor $224_2$ invokes an appropriate routine within transaction database access routines $227_n$ to determine the address of the next record in the PVN context file (not specifically shown) situated within new application databases $562_n$ and then add a new record to his context file to store the context of all PVN call processing associated with this query. Call processor $224_2$ then formulates a conversational message. This message contains the op code needed to instruct SSP 30 to obtain the necessary information from the caller. Thereafter, TCAP Processes $226_1$ form a TCAP conversational message, represented by "(V)", that contains a specific value stored in both the CP_NUM (bits $<25:23>$) and tid (bits $<22:0>$) bits, as shown in FIG. 4, for the originating transaction identifier. This value identifies the specific call processor and the context file within application databases $562_n$ and thereby provides the relative address of the particular record residing within that file at which the context information for this transaction is being stored. In addition, since the new version of the application databases, i.e. databases $562_n$, is being used to process this transaction, TCAP Processes $226_n$ executing with BE Processor $220_n$, shown in FIGS. 8A and 8B, also sets the value of the file version (FV) bit (bit $<26>$) (see FIG. 4) situated within the originating transaction identifier field in TCAP conversational message (V) to "1" to specify that the new version of the application databases, i.e. databases $562_n$, is to be used to process this entire transaction. The value of the originating transaction identifier that existed Within the TCAP query message initially generated by SSP 30 is copied by routines $227_n$ into the responding transaction identifier that forms part of this message. Thereafter, TCAP conversational message (V) is routed, as symbolized by line 859 shown in FIGS. 8A and 8B, over link $216_n$ to FE processor $210_n$ which, in turn, fabricates a SS7 packet that contains this TCAP conversational message, and then transmits this packet represented by the circled letter "V", over active link $83_n$, as symbolized by line 861, to STP 56 for eventual routing through CCS network 50 to SSP 30 (see FIG. 3). Conventional transaction processing continues in a similar manner with all application database access operations being made by various back-end processors into new application databases $562_n$ until this illustrative transaction is completely processed, and likewise for all other transactions that start during this time. Inasmuch as this illustrative transaction started during the transfer period, all conversational transaction processing for this transaction occurs through only the new versions of the application databases.

Consequently, it is now readily apparent that through my invention, all conversational transactions that start before the occurrence of a transfer period will be processed using only the old versions of their application databases regardless of whether the processing of those transactions extends into such a period; while those transactions that start during a transfer period will be processed using only the new versions of their application databases. Once the transfer period expires, the back-end processors will no longer be processing any transactions using the old versions of the application databases. As such, these versions can then be deleted from disk storage. Thereafter, the new versions of the databases are assigned to be the old versions thereof, with respect to identification by the file version bit, in preparation for the next database update.

Now, having discussed the updating operations and illustrative message flow associated with my invention, the discussion will conclude with an examination of the various software routines that are used in implementing my invention.

Of these routines, Application Database Management Routine 900 (shown in FIGS. 9A and 9B), executes within each BE processor to manage transaction processing and application database access. Two other routines, are called by routine 900; namely, Asynchronous "Retrofit Commit" Command Reception Routine 1000 shown in FIG. 10) that starts a transfer period timer and sets a flag and Transfer Period Timer Expiration Routine 1100 (shown in FIG. 11) that resets both the flag and various file pointers. The remaining routines, namely CREATE Routine 1200 (shown in FIG. 12), LOCATE Routine 1300 (shown in FIG. 13), OPEN Routina 1400 (shown in FIGS. 14A and 14B), CLOSE Routine 1500 (shown in FIG. 15), ADO Routine 1600 (shown in FIG. 16) and GET Routine 1700 (shown in FIG. 17), all form part of transaction database access routines, such as access routines $227_1$ in BE processor $220_1$, that also execute on every BE processor.

Application Database Management Routine 900, shown in FIGS. 9A and 9B, opens application databases and supervises the incremental processing of individual transactions by a BE processor and, in particular, selects the specific database version which that processor will access in incrementally processing a transaction. A BE processor initiates execution of this routine whenever application processing is brought "up" on that processor. Routine 900 executes as long as this BE processor is performing transaction processing. Upon entry into this routine, as shown, execution first proceeds to block 905 which opens the current old) version of each application database that Will can be used by that BE processor. Thereafter, execution passes to decision block 910. In the event this BE processor is not to undertake retrofit (also herein referred to as updating) operations through my invention, as specified by the state of an internal flag initially set by maintenance and operations subsystem 270 (see FIGS. 2A and 2B), then execution is directed, via No path 912, directly to block 935 to begin transaction processing as discussed in detail below. Accordingly, this BE processor will process transactions using only the old versions of the application databases. Alternatively, if this BE processor is to undertake such retrofit (update) operations, then decision block 910 routes execution, via YES path 911, to block 915. This block, when executed, opens each new version of every application database associated With that BE processor Specifically, if the new version of any such database has been previously loaded into the disk space for this processor, as in the case of a newly loaded database containing customer records, then this database is merely opened for subsequent access. Alternatively, if a new version of this database does not exist such as for a context file, then block 915 creates a new, though empty, version of this database for subsequent use by the BE processor Once this has occurred, execution proceeds to block 920 which enables a software communication handler executing within this BE processor to notify this processor whenever it receives an asynchronous "retrofit commit" command over the administrative ETHERNET network from maintenance and operation sub-system 270 (see FIGS. 2A and 2B). Once block 920 has executed, execution passes to transaction processing routine 930.

Transaction processing routine 930 supervises transaction processing and database access operations used in incrementally processing individual transactions. Specifically, upon entry into this routine, execution proceeds to block 935 which obtains an incoming TCAP transactional message from an associated FE processor Thereafter, this message is tested by decision block 940 to determine whether this transactional message is a query, thereby signifying a new transaction, or a conversational message that forms part of a current on-going transaction. In the event the incoming transactional message is a conversational message, then decision block 940 routes execution, via its NO path to block 945. This latter block obtains the value of the file version (FV) bit contained within the responding transaction identifier that forms part of this message. Thereafter, block 950 executes to obtain, again from the responding transaction identifier for this message, the relative address of a record within a context file at which context information is stored for the current transaction. Once this occurs, execution proceeds to block 955. This block, when executed by the BE processor, uses the information contained within the responding transaction identifier to access the version of the application databases, and specifically the version specified by the file version bit, in order to obtain appropriate context information and the proper customer record for this transaction. Next, execution proceeds to block 960 which, using the data supplied in the incoming TCAP conversational message and the customer record and context information, incrementally processes the transaction and then appropriately updates the stored context information therefor. Once this incremental transaction processing concludes, execution then loops back, via paths 961 and 963, to block 935 to process the next incoming transactional message and so on.

Alternatively, in the event that the incoming TCAP transactional message is a query thereby signifying a new transaction, then decision block 940 routes execution, via its YES path to decision block 965. This latter decision block determines, based upon whether the state of a "COMMIT" flag is "1", if the BE processor is presently within a five minute transfer period. If a transfer period is underway, then decision block 965 routes execution, via its YES path, to block 975 Which sets the file version (FV) bit within the originating transaction identifier associated with an outgoing TCAP conversational message for this transaction to one, thereby signifying that the new versions of the appropriate application databases are to be used by any BE processor to incrementally process subsequent conversational messages associated with this transaction. Alternatively, if a transfer period is not underway, then decision block 965 routes execution, via its NO path, to block 970 which sets the file version (FV) bit within this originating transaction identifier to zero, thereby signifying that the old versions of the appropriate application databases are to be used instead in incrementally processing subsequent conversational messages associated With this transaction. Once the file version bit has been set by either blocks 970 or 975, execution proceeds to block 980 which accesses the customer record for this transaction from the appropriate version of the application databases. Thereafter, execution proceeds to block 985 which, when executed, adds a new record to the context file on the appropriate version of the application databases for this transaction. Next, execution passes to block 990 which, using the data supplied in the incoming query and the customer record and context information, incrementally processes the transaction and then appropriately updates the stored context information therefor. Once this incremental transaction processing concludes, execution then loops back, via paths 993 and 963, to block 935 to process the next incoming transactional message and so on.

Now, a "retrofit commit" command can occur anytime during the processing of transaction processing routine 930. When this command occurs, execution departs from routine 900 and is directed on an interrupt basis to Asynchronous "Retrofit Commit" Command Reception routine 1000, shown in FIG. 10. Upon entry into this routine, execution proceeds to block 1010 which starts a "TRANSFER PERIOD" timer, that illustratively times a five minute interval, and generates an interrupt at the conclusion of this interval. Once this timer is started, execution passes to block 1020 which sets the state of the "COMMIT" flag to one. As noted this flag is tested within routine 900 to determine if a transfer period is in progress. After this flag is set, execution exits from routine 1000 and returns to the point of departure within routine 900.

Whenever the "TRANSFER PERIOD" timer reaches the end of its timing cycle thereby signifying the expiration of the transfer period, execution departs from routine 900 and is directed, again on an interrupt basis, to Transfer period Timer Expiration routine 1100 shown in FIG. 11. Upon entry into this routine, execution proceeds to block 1110 which, when executed, resets the value of the "COMMIT" flag to zero in order to signify that a transfer period is not now in progress. Thereafter, execution proceeds to block 1120 which sets various software pointers that hold the addresses of the old versions of the application databases for the associated BE processor to point to the addresses of the new versions of the application databases associated with this processor for use during the next transfer period. Once this occurs, execution exits from routine 1100 and returns to the point of departure within routine 900.

The discussion will now address the transaction database access routines, specifically CREATE Routine 1200, LOCATE Routine 1300, OPEN Routine 1400, CLOSE Routine 1500, ADD Routine 1600 and GET Routine 1700, that also execute on every BE processor FIG. 12 shows a flowchart of CREATE Routine 1200. This routine, when executed, creates and initializes the appropriate version (old or new) of the context file for the specific call processor (e.g. call processor j) that called this routine. This routine is executed whenever that call processor is brought on-line.

Specifically, upon entry into routine 1200, execution first proceeds to block 1210. This block, when executed, initializes a file access block and record access block for the appropriate version of the context file for call processor j. The file and record access blocks are control blocks (effectively buffers) used by the operating system executing in a BE processor to store attribute information regarding the file and the record, respectively, that will be subsequently created. Thereafter, execution proceeds to block 1220 Which creates a file by making an entry in an appropriate directory and then assigns this file as a context file for call processor j. Block 1230 is then executed to close this file. Thereafter, execution proceeds to block 1240, which, when executed, returns a message indicating that the context file creation process has been successfully completed. Once this occurs, execution exits from routine 1200 and returns to a call processor.

FIG. 13 shows a flowchart of LOCATE Routine 1300. This routine, when executed, searches through the appropriate version of the context file associated With the specific call processor that called this routine in order to determine the most recent value of the transaction identifier currently in use in this context file.

Specifically, upon entry in routine 1300, execution proceeds to block 1310 which opens the appropriate version (old or new) of the context file associated with call processor j. Once this occurs, execution proceeds to block 320. This block, when executed, searches through all the individual records within this context file to locate that record having a latest time stamp. Since each record carries a time stamp entry of When it was created, the latest time stamp specifies the most recently created record and hence, by use f relative addressing inherent in the context file, the most recent transaction identifier then in use. Once this record is located, execution proceeds to block 1330. This block, when executed, returns the value of the transaction identifier for this context file for call processor j by placing this value in an appropriate table. Thereafter, block 1340 executes to close this context file associated with call processor j. Thereafter, execution proceeds to block 1350 which, when executed, returns a message indicating that this routine has successfully executed. Once this occurs, execution exits from routine 1300 and returns to a call processor.

Figure 14B:
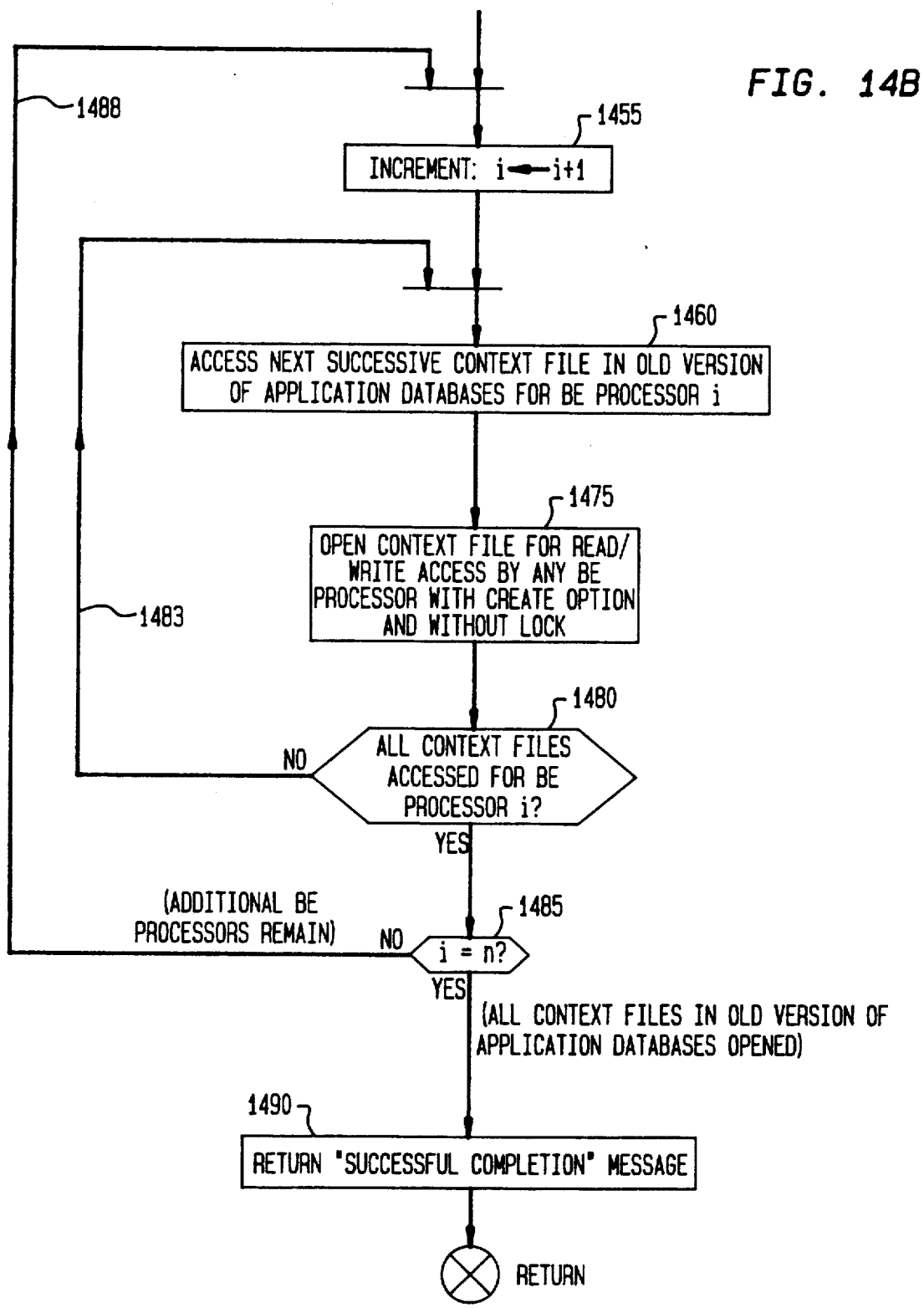

A flowchart of OPEN Routine 1400 is collectively shown in FIGS. 14A and 14B, for which the correct alignment of the drawing sheets for these figures is depicted in FIG. 14. This routine, When executed, opens either an old or new version of all the context files in the application databases for all back-end processors in the SCP. This routine is executed Whenever SCP application software is to be brought up on all BE processors, such as after a power up condition, or to begin use of a specific version of the context files on the SCP.

Specifically, upon entry into routine 1400, execution proceeds to block 1405 which, when executed, initializes the contents of loop counter i to zero. During subsequent execution of this routine, counter i will point to a specific BE processor for which context files are being opened. Thereafter, decision block 1410 is executed. This block, when executed, tests the value of a user specified parameter to determine whether a new version of the application databases for all the BE processors is to be opened. In the event the new version is to be opened, then decision block 1410 routes execution, via its YES path, to block 1415. This latter block, When executed, increments the contents of counter i by one. Execution then passes to block 1420 which accesses the next successive context file in the new version of application databases for BE processor i (first context file for this processor if this routine has just started executing). Thereafter, execution proceeds to block 1430 which, when executed, opens this context file for read/write access by any BE processor with a create option selected and without a lock option selected. By selecting the create option, this call processor is informed by the operating system that it has the power to subsequently create the file if the file is not yet in existence. Through use of this option, a call processor will only create its associated context file and will not create a context file for a different call processor. After block 1430 has executed, execution proceeds to decision block 1440 to determine if all the context files associated with the BE processor i have been accessed. If any such files remain to be accessed, i.e. specifically opened, then execution proceeds from decision block 1440, via NO path 1443, to block 1420 in order to access the next successive one of these files and so on. Alternatively, if all the context files have been accessed, then decision block 1440 routes execution, via its YES path, to decision block 1445. This latter decision block determines whether the application databases for all the BE processors in the SCP have been accessed, i.e. Whether the contents of counter i equal the value "n" (the number, which has been supplied to the routine as a calling parameter, of separate back-end processors situated within an SCP). In the event remaining BE processors with unaccessed application databases exist, i.e. the contents of counter i are less than the value "n", then decision block 1445 routes execution, via NO path 1448, back to block 1415 to access the application databases for the next successive BE processor and so on. However, if the application databases for all the BE processors in the SCP have been accessed, then decision block 1445 routes execution, via its YES path, to block 1450. This latter block, when executed, returns a message indicating that this routine has successfully executed. Once this occurs, execution exits from routine 1400 nd returns to a call processor that called this routine.

Now, if the old version of the application databases for all the call processors on the specified BE processor is to be opened, then decision block 1410 routes execution, via NO path 1413, to block 1455. This latter block, when executed, increments the contents of counter i by one. Thereafter, execution proceeds to block 1460. This block, when executed, accesses the next successive context file in the old version of the application databases for the BE processor i (first context file for this processor if this routine has just started executing). Once this occurs, execution proceeds to block 1475 which, when executed, opens this context file for read/write access by any BE processor With a create option selected and without a lock option selected. After block 1475 has executed, execution proceeds to decision block 1480 to determine if all the context files associated with the BE processor i have been accessed. If any such files remain to be accessed, i.e. specifically opened, then execution proceeds from decision block 1480, via NO path 1483, to block 1460 in order to access the next successive one of these files and so on. Alternatively, if all the context files for BE processor i have been accessed, then decision block 1480 routes execution, via its YES path, to decision block 1485. This latter decision block determines whether the application databases for all the BE processors in the SCP have been accessed, i.e. whether the contents of counter i equals the value "n". In the event remaining BE processors with unaccessed application databases exist, i.e. the contents of counter i are less than the value "n", then decision block 1485 routes execution, via NO path 1488, back to block 1455 to access the application databases for the next successive BE processor and so on. However, if the application databases for all the BE processors in the SCP have been accessed, then decision block 1485 routes execution, via its YES path, to block 1490. This latter block, when executed, returns a message indicating that this routine has successfully executed. Once this occurs, execution exits from routine 1400 and returns to a call processor that called this routine.

FIG. 15 shows a flowchart of CLOSE Routine 1500. This routine, when executed, closes either an old or new version of all the context files in the application databases for every back-end processor in the SCP. This routine is executed whenever SCP application software is to be brought down, such as before a power off condition, or to completely cease use of a specific version of the context files.

Specifically, upon entry into routine 1500, execution proceeds to decision block 1510. This block, based upon the value of a calling parameter, determines whether the new version of the context files in the application databases for every specific back-end processor is to be closed. In the event the new version is to be closed, then decision block 1510 routes execution, via its YES path, to block 1530. This latter block, when executed, successively closes each new version of the context files in the application databases for very back-end processor. Alternatively, if the old version of the context files in the application databases is to be closed, then decision block 1510 routes execution, via its NO path, to execution block 1520. This block, when executed, successively closes each old version of the context files in the application databases for every back-end processor. Thereafter, once block 1520 or 1530 fully executes, execution proceeds to block 1540. Block 1540, when executed, merely returns a message indicating that this routine has successfully executed. Once this occurs, execution exits from routine 1500 and returns to a call processor that invoked this routine.

Figure 16:
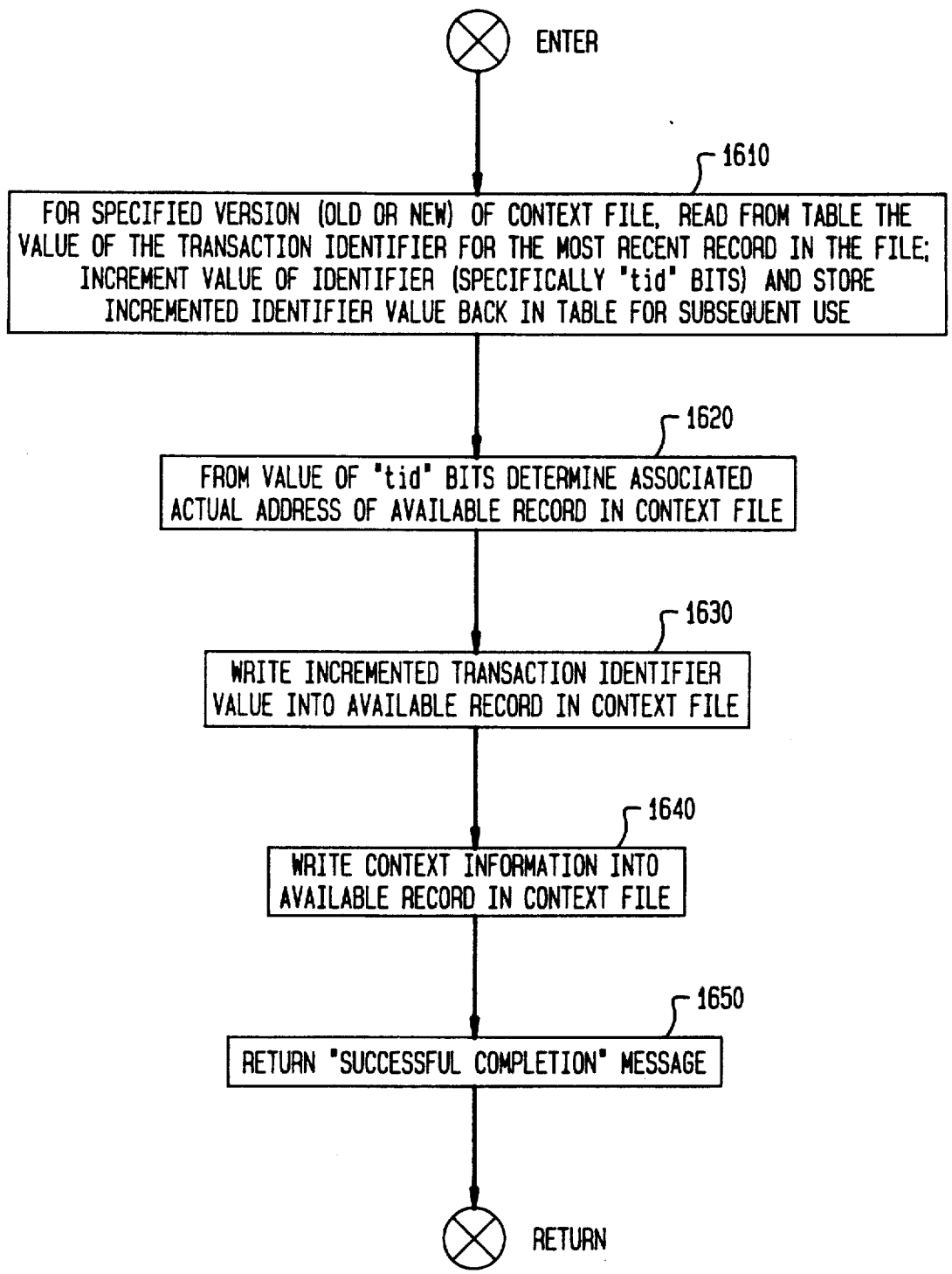
FIG. 16 shows a flowchart of ADD Routine 1600.

FIG. 16 shows a flowchart of ADD Routine 1600. This routine, when executed, inserts a new record into a specific version (old or new) of a context file. As such, this routine is invoked by a call processor only at the beginning of conversational transaction processing for a current transaction.

Specifically, upon entry into routine 1600, execution proceeds to block 1610 which for a specific version (old or new) of a context file, designated by the values of appropriate calling parameters that identify a specific call processor, a specific back-end processor and a specific file version, reads the value of the transaction identifier associated with the most recent record from the table associated with this file and used by the LOCATE routine. This block then increments this value (specifically by incrementing the value of the "tid" bits by one) and stores the new transaction identifier value back into the table. Thereafter, execution proceeds to block 1620. This block, when executed, determines the actual address of the next available record in the context value from the incremented value of the "tid" bits. Once this has occurred, execution proceeds to block 1630 which, when executed, writes the incremented transaction identifier value into this record in the context file. Thereafter, block 1640 is executed to write initial context information regarding the current transaction into this record. After this occurs, block 1650 executes to merely return a message indicating that this execution of routine 1600 has been successfully completed. Thereafter, execution exits from routine 1600 and returns to a call processor that invoked this routine.

Figure 17:
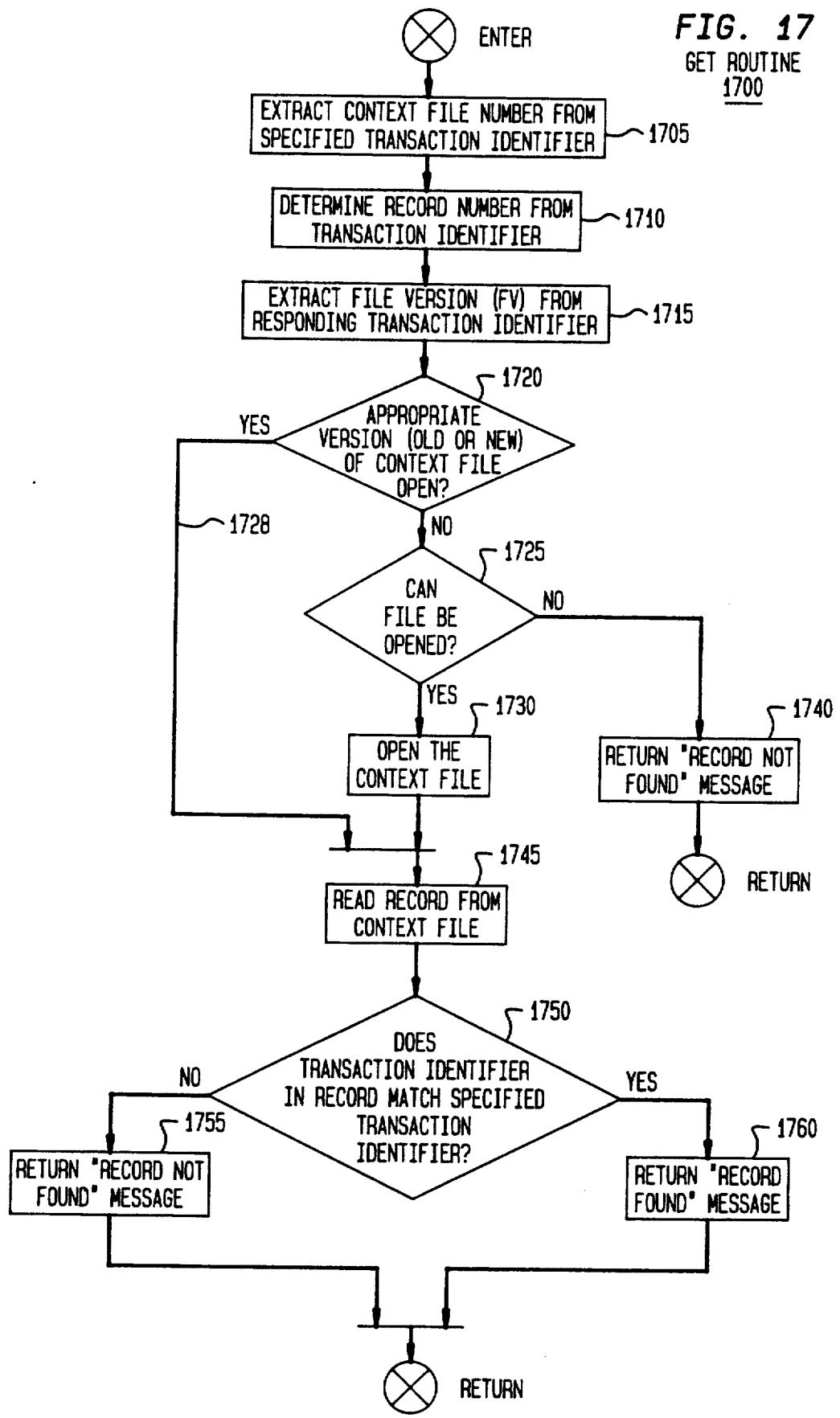
FIG. 17 shows a flowchart of GET Routine 1700.

FIG. 17 shows a flowchart of GET Routine 1700. In essence, this routine, when executed, searches a specific context file for a requested record and then, once the record is found; reads the record from the file.

Specifically, upon entry into routine 1700, execution first proceeds to block 1705. This block, when executed, extracts a file number of the desired context file from the responding transaction identifier that has been specified as a calling parameter to the routine. Thereafter, block 1710 is executed to determine the record number from the transaction identifier. Once this occurs, execution proceeds to decision block 1715 to extract the file version from the responding transaction identifier. Thereafter, execution proceeds to decision block 1720 to determine if the appropriate version of the context file is open. If this file has not been opened, then decision block 1720 routes execution, via its NO path, to decision block 1725. This latter decision block determines whether this context file can be opened at all. If the operating system executing in the back-end processor specifies that this file can not be opened, then decision block 1725 routes execution, via its NO path, to block 1740. This latter block returns an appropriate error message specifying that the desired record can not be found. Thereafter, execution exits from routine 1700 and returns to a call processor that invoked routine 1700. Alternatively, if the desired context file can be opened, then decision block 1725 routes execution to block 1730 which, when executed, opens this context file.

Now, if this context file has already been opened, execution proceeds, via YES path 1728, to block 1745. Alternatively, execution reaches block 1745 after block 1730 has executed to open this file. In either case, block 1745 reads the desired record from the appropriate version (old or new) of the context file. Now, once this occurs, the value of the transaction identifier stored within the record is compared against the value of the responding transaction identifier used to access this record to determine if the proper record has been accessed. Specifically, once the record has been read, execution proceeds to decision block 1750. This decision block compares the value of the transaction identifier stored within the record to the value of the responding transaction identifier used to access this record. In the event a match occurs, which is the normal condition, then execution proceeds from decision block 1750, via its YES path, to block 1760. This latter block, when executed, returns an appropriate message indicating that the desired record has been found. Alternatively, if a match does not occur, i.e. indicative of an error condition, then execution proceeds from decision block 1750, via its NO path, to block 1755. This latter block, when executed, returns an appropriate message indicating that the desired record has not been found. Once either block 1755 or 1760 executes, then execution exits from routine 1700 and returns to a call processor. This now concludes the discussion of the specific software routines used in implementing my inventive method.

Although my invention has been described in the context of an "n+1" distributed processing system in which new software, i.e. application programs and databases, is loaded on only one processor at a time, such as shown in FIG. 7, those skilled in the art will clearly recognize that my invention is equally applicable to processing systems wherein a group of processors can be taken "down" and loaded with new software, such as through a Well-known logical split arrangement. The number of active processors that can be brought "down" will depend upon the architecture and processing demands of the particular application then in use.

In addition, my invention is applicable to a transaction processing system that utilizes any number of processors that perform conversational transaction processing. Although the disclosed embodiment contains "n+1" processors, my invention can be used With a system that contains as few as only one processor or any number of additional processors.

Furthermore, although my invention has been described in the context of changing between two versions of corresponding application databases, my invention can be used to shift execution among any number of different versions, such as three, four and even more. In this case, each transaction, based upon illustratively the time at which it was initiated, would be completely processed with one specific version of the databases, thereby obviating the possibility that any transaction will sequentially access two different versions of the same databases and prematurely terminate as a result. Different selection criteria other than time of initiation could be used to associate a given transaction with one specific version of the application databases.

Moreover, although the BE processors used in the illustrative replicated FE-BE architecture discussed above that provides transactional processing in an SCP are all located Within a single system in one geographic location and connected to a shared disk farm also co-located thereat, the transactional processors that can utilize my invention can be geographically dispersed as long as they all have direct or indirect access to application databases residing within the shared disk farm regardless of where that disk farm is actually located. The processors can either be part of a distinct processing cluster where only those processors in the cluster have access to a shared disk farm or can be geographically dispersed with all processors in the system having remote access to a shared disk farm. Moreover, substantially any shared memory device, such as but not limited to a multi-ported semiconductor memory, that can be accessed by several processors and provides a adequate storage capacity for the application databases that will be used by the individual applications executing on the individual processors and a sufficiently small access time can be substituted for the shared disk farm. The specific type of the memory Will of course be governed by various desired characteristics of the distributed processing system. Clearly, then, my invention can find use in updating application databases in a variety of distributed processing systems that have widely varying architectures but are nevertheless able to process conversational transactions.

Although a single embodiment which incorporates the teachings of the present invention has been shown and described herein, those skilled in the art can readily devise many other varied embodiments that incorporate these teachings.

I claim:

1. A method for updating from a first version of a database residing within a memory device associated with a first node to a second version thereof and accessible by a processor connected to a second node, said first and second nodes being connected by a communication path so that transactional messages can be sent between said first and second nodes for conversational transaction processing, said method comprising the steps of, at said first node, processing transactional messages of each first transaction that has been initiated prior to the start of a predefined transfer time period using the first version of said database regardless of whether any of the transactional messages of a first transaction occurs after the start of the transfer period;

loading the second version of said database onto said memory device prior to the start of said transfer time period;

initiating said transfer time period;

processing transactional messages of each second transaction that is initiated after the start and before the expiration of said transfer time period using said second version of said data base;

said processing steps each further comprising the step of setting a pre-defined field in a next subsequently occurring transactional message of the first or second transaction to a pre-defined value to specify whether said first or said second version of the database is to be used in processing the transaction of the next transactional message; and transmitting the value of said pre-defined field in the next subsequent occurring transactional message from the first node to the second node; and said method further comprising at said second node the step of echoing from said second node to said first node said value of said pre-defined field in succeeding transactional messages, whereby the echoed pre-defined field assures that sequential access for successive transactional messages of a first and second transaction are processed only by said first and second databases respectively.

2. The method in claim 1 further comprising the step of maintaining said first and second versions of the database in an on-line condition during said transfer time period.

3. A method for updating from a first version to a second version a database residing within a memory device and accessible by a plurality of processors connected to a network for conversational transaction processing and said network comprising a responding node to which said processors are connected and an originating node, said responding and originating nodes being connected by a communication path extending therebetween so that transactional messages can be sent between said originating and said responding nodes, said method comprising the steps of, at said processing transactional messages of each first transaction that has been initiated prior to a start of a pre-defined transfer time period using the first version of said database regardless of whether any of the transactional messages of a first transaction occurs after the start of the transfer period responding node, processing said transactional messages, received from said originating node, of each second transaction that is initiated after the start and before the expiration of said transfer period using said second version of said database;

loading the second version of said database onto said memory device prior to the start of said transfer time period;

initiating said transfer time period; and processing transactional messages, received form said originating node, of each second transaction that is initiated after the start and before the expiration of said transfer period using said second version of said database;

said processing steps each further comprising the steps of setting a pre-defined field in a next successively occurring transactional message to a pre-defined value to specify whether said first or second version of the database is to be used in processing the transaction of said next transaction message of said first or second transaction;

and said method further comprising the steps of, at said responding node;

placing the value in a first pre-defined field in an originating transaction identifier that forms part of a subsequent outgoing transactional message;

transmitting said subsequent outgoing transactional message to said originating node; and processing a subsequent incoming transactional message received over said communication path from said originating node using the specific version of the database specified by a value in a second field in a responding transaction identifier contained within said subsequent incoming transactional message; and, at said originating node;

receiving said outgoing transactional message transmitted over said communication path from said responding node;

echoing the value of the first field located within said originating transaction identifier contained within said outgoing transactional message as the value of the second field within the responding transaction identifier contained within a next successive transactional message of said first or second transaction; and transmitting said next successive transactional message of said first or second transaction to said responding node as said subsequent incoming message, whereby the echoed value determines for said responding node which version of the data based is to be used.

4. The method in claim 3 further comprising the step of repeating, for each of said transactions, the steps undertaken at said responding and originating nodes for each subsequent conversation occurring between the originating and responding nodes for the transaction.

5. The method in claim 4 wherein said first and second fields are file version bits that respectively form part of the responding and originating transaction identifiers.

6. In a conversational transaction processing system having a plurality of processors connected to a network and which access information from a database residing within a memory device to incrementally process a conversation transaction a responding node to which said processors are connected, and an originating node, said responding and originating nodes being connected by a communication path extending therebetween so that transactional messages can be sent between said originating and said responding nodes, a method for updating the databases from a first to a second version thereof comprising the steps of:

at said responding node, first processing transactional messages transmitted form said originating node and of each first transaction that has been initiated prior to a start of pre-defined transfer time period using the first version of said database regardless of whether any of the transactional messages of any of the first transactions occurs after the start of a transfer time period;

loading the second version of said database onto said memory device prior to the start of the transfer time period;

initiating the transfer time period, said transfer time period being longer than the time required for processing any transactions using the first version of the database;

maintaining said first and second version of the database in an on-line condition during said transfer time period;

at said responding node, second processing each transactional message transmitted form said originating node and of each second transaction that is initiated after the start and before the expiration of the transfer time period using the second version of said database such that said first and second transactions are processed only using said first or second versions, respectively, of said database;

said first and second processing steps each further comprising at said responding node the steps of setting a pre-defined field in a next successively occurring transactional message of each of said transactions to a pre-defined value to specify whether said first or second version of the database is to be used in processing the transaction of said next transactional message of said first or second transaction; and deleting the first version of said database from said memory device after the transfer time period has expired; and the method further comprising the steps of, at said responding node;

placing the value in a first pre-defined field situated in an originating transaction identifier that forms a part of a subsequent outgoing transactional message;

transmitting said subsequent outgoing transactional message to said originating node; and processing a subsequent incoming transactional message received over said communication path from said originating node using the specific version of the database specified by a value in a second field in a responding transaction identifier contained within said subsequent incoming transactional message; and at said originating node:

receiving said outgoing transactional message appearing over said communication path and transmitted from said responding node;

echoing the value of the first field located within said originating transaction identifier contained within said outgoing transactional message as the value of the second field situated within the responding transaction identifier contained within a next successive transactional message over said communication path to said originating node as said subsequent incoming message, whereby the echoed value determines the version of the database to be employed at the responding node.

7. The method in claim 6 further comprising the step of repeating, for each of said transactions, the steps undertaken at said responding and originating nodes for each subsequent conversation occurring between the originating and responding nodes for that transaction.

8. The method in claim 7 wherein said first and second fields are file version bits that respectively form part of the responding and originating transaction identifiers.

9. In a conversation transaction processing system having a processor which accesses information from a database residing within a memory device to incrementally process a conversational transaction, a responding node to which said processor is connected and an originating node, said responding and originating nodes being connected by a communication path therebetween so that transactional messages can be sent between said originating and responding nodes, an arrangement for updating the database from a first to a second version thereof comprising,
means at said responding node for loading a second version of a database onto said memory device while a first version is also resident therein;
means for deleting the first version of said database from said memory device after expiration of a pre-defined updating transfer period;
means at said responding node for setting a pre-defined field in next successively occurring conversational messages prior to expiration of said transfer period, wherein the pre-defined field is set to a first value for processing transactions using the first version of the database and to a second value for processing transactions using the second version of the database;
means at said responding node for transmitting an outgoing conversational message containing the pre-defined value to said originating node; and
means at said originating node for echoing said predefined value to said responding node for determining the one of said first and second databases to be used for processing subsequent conversational messages.

10. In a conversation transaction processing system having a plurality of processors connected to a network and which access information from a database residing within a memory device to incrementally process a conversational transaction, a responding node to which said processors are connected and an originating node, said responding and originating nodes being connected by a communication path extending therebetween so that transactional messages can be sent between said originating and responding nodes, an arrangement for updating the database from a first to a second version thereof comprising:
first means at said responding node for processing transactional messages of each first transaction that has been initiated prior to a start of a pre-defined transfer time period using the first version of said database regardless of whether any of the first transactions occurs after the start of a transfer time period;
means for loading the second version of said database onto said memory device prior to the start of the transfer period;
means for initiating the transfer time period, said first and second versions of the database being maintained in an on-line condition during said transfer time period;
second means at said responding node for processing each transactional message of each second transaction that is initiated after the start and before the expiration of the transfer time period using the second version of said database whereby said first and second transactions are processed only using said first or second versions, respectively, of said database and sequential access into the first and second versions of said versions of said database for successive transactional messages of the same transaction is avoided; and
means for deleting the first version of said database from said memory device after the transfer time period has expired;
said first and second processing means each further comprises means for setting a pre-defined field in a next successively occurring conversational message associated with each of said transactions to a pre-defined value to specify whether said first or second version of the database is to be used in processing the transaction that is associated with said next conversational message; and
the arrangement further comprising
at said responding node:
means for placing the value in a first pre-defined field situated in an originating transaction identifier that forms part of a subsequent outgoing transactional message;
means for transmitting said subsequent outgoing transactional message to said originating node; and
means for processing a subsequent incoming transactional message received over said communication path from said originating node using the specific version of the database specified by a value in a second field in a responding transaction identifier contained within said subsequent incoming transactional message; and
at said originating node:
means for receiving said outgoing transactional message appearing over said communication path and transmitted from said responding node;
means for echoing the value of the first field located within said originating transaction identifier contained within said outgoing transactional message as the value of the second field situated within the responding transaction identifier contained within a next successive transaction message of said first or second transaction; and
means for transmitting said next successive transactional message of said first or second transaction over said communication path to said responding node as said subsequent incoming message, whereby the echoed value determines the version of the database to be used at the responding node.

11. The arrangement in claim 10 wherein said first and second fields are file version bits that respectively form part of the responding and originating transaction identifiers.

* * * * *